United States Patent
Calman et al.

(10) Patent No.: US 9,519,928 B2
(45) Date of Patent: Dec. 13, 2016

(54) PRODUCT EVALUATION BASED ON ELECTRONIC RECEIPT DATA

(71) Applicant: BANK OF AMERICA CORPORATION, Charlotte, NC (US)

(72) Inventors: Matthew A. Calman, Charlotte, NC (US); Katherine Dintenfass, Charlotte, NC (US); Jason P. Blackhurst, Charlotte, NC (US); Carrie A. Hanson, Charlotte, NC (US); Laura C. Bondesen, Charlotte, NC (US)

(73) Assignee: Bank of American Corporation, Charlotte, NC (US)

( * ) Notice: Subject to any disclaimer, the term of this patent is extended or adjusted under 35 U.S.C. 154(b) by 807 days.

(21) Appl. No.: 13/953,223

(22) Filed: Jul. 29, 2013

(65) Prior Publication Data

US 2015/0032526 A1    Jan. 29, 2015

(51) Int. Cl.
*G06Q 30/06* (2012.01)
*G06Q 30/02* (2012.01)

(52) U.S. Cl.
CPC ...... *G06Q 30/0631* (2013.01); *G06Q 30/0215* (2013.01); *G06Q 30/0224* (2013.01); *G06Q 30/0623* (2013.01); *G06Q 30/0629* (2013.01)

(58) Field of Classification Search
None
See application file for complete search history.

(56) References Cited

U.S. PATENT DOCUMENTS 5,739,512 A    4/1998  Tognazzini
5,974,396 A   10/1999  Anderson et al.
(Continued)

OTHER PUBLICATIONS

Finovate Startup 2009 Video Archives >> Expensify (retrieved online from <http://www.finovate.com/startup09vid/expensify.html> and <http://www.finovate.com/startup09vid/videos/quicktime/Expensify.mov>) pp. 1-3 screenshots of website hosting video presentation. pp.4-15 screen shots of the Expensify video presentation.

(Continued)

*Primary Examiner* — Kristy A Haupt
(74) *Attorney, Agent, or Firm* — Michael A. Springs; Moore & Van Allen PLLC; Peter B. Stewart

(57) ABSTRACT

Embodiments of the invention are directed to systems, methods and computer program products for providing product evaluation. An exemplary apparatus is configured to identify purchase transaction data associated with identified electronic communications between a merchant and a customer, the purchase transaction data includes product level data from a transaction, receive the identified purchase transaction data, the purchase transaction data is received in an unstructured format, convert the purchase transaction data from the unstructured format to a structured format, associate the structured purchase transaction data with the customer's online banking application, aggregate purchase transaction data related to one or more products purchased by the customer, determine one or more products are purchased on a recurring basis, and provide the customer with one or more options based at least partially on determining the one or more products are purchased on a recurring basis.

24 Claims, 11 Drawing Sheets

(56) References Cited

U.S. PATENT DOCUMENTS

| | | |
|---|---|---|
| 6,394,341 B1 * | 5/2002 | Makipaa .............. G06Q 20/02 235/379 |
| 6,487,540 B1 | 11/2002 | Smith et al. |
| 6,865,546 B1 | 3/2005 | Song |
| 6,898,598 B2 | 5/2005 | Himmel et al. |
| 7,013,290 B2 | 3/2006 | Ananian |
| 7,127,414 B1 | 10/2006 | Awadallah et al. |
| 7,158,948 B1 | 1/2007 | Rodriguez et al. |
| 7,213,754 B2 | 5/2007 | Eglen et al. |
| 7,376,591 B2 | 5/2008 | Owens |
| 7,487,912 B2 | 2/2009 | Seifert et al. |
| 7,529,688 B2 | 5/2009 | Prakash |
| 7,548,889 B2 | 6/2009 | Bhambri et al. |
| 7,742,989 B2 | 6/2010 | Schultz |
| 7,783,515 B1 | 8/2010 | Kumar et al. |
| 7,797,192 B2 | 9/2010 | Mitchell et al. |
| 8,015,076 B2 | 9/2011 | Owens |
| 8,160,929 B1 | 4/2012 | Park et al. |
| 8,271,344 B1 | 9/2012 | Channakeshava et al. |
| 2002/0062249 A1 | 5/2002 | Iannacci |
| 2002/0116249 A1 | 8/2002 | Ellinger et al. |
| 2002/0152123 A1 | 10/2002 | Giordano et al. |
| 2002/0188561 A1 | 12/2002 | Schultz |
| 2003/0018550 A1 | 1/2003 | Rotman et al. |
| 2003/0182204 A1 | 9/2003 | Rhee |
| 2003/0217005 A1 | 11/2003 | Drummond et al. |
| 2004/0064373 A1 | 4/2004 | Shannon |
| 2004/0220964 A1 | 11/2004 | Shiftan et al. |
| 2006/0289621 A1 | 12/2006 | Foss, Jr. et al. |
| 2006/0293956 A1 | 12/2006 | Walker et al. |
| 2007/0069013 A1 | 3/2007 | Seifert et al. |
| 2007/0094088 A1 | 4/2007 | Mastie et al. |
| 2007/0244741 A1 | 10/2007 | Blume et al. |
| 2007/0271141 A1 | 11/2007 | Storm |
| 2007/0272740 A1 | 11/2007 | Palacios |
| 2008/0091528 A1 | 4/2008 | Rampell et al. |
| 2008/0133325 A1 | 6/2008 | De et al. |
| 2008/0162279 A1 | 7/2008 | Hershkovitz et al. |
| 2010/0076836 A1 | 3/2010 | Giordano et al. |
| 2010/0223165 A1 | 9/2010 | Calman et al. |
| 2010/0250338 A1 | 9/2010 | Banerjee et al. |
| 2010/0257066 A1 | 10/2010 | Jones et al. |
| 2011/0276430 A1 | 11/2011 | Vyas et al. |
| 2012/0191565 A1 * | 7/2012 | Blank ................ G06Q 30/0641 705/26.8 |
| 2012/0221446 A1 | 8/2012 | Grigg et al. |
| 2013/0036001 A1 * | 2/2013 | Wegner ................ G06Q 30/02 705/14.31 |
| 2013/0080239 A1 | 3/2013 | Okerlund |
| 2013/0097002 A1 | 4/2013 | Dishneau et al. |
| 2013/0311324 A1 * | 11/2013 | Stoll ................ G06Q 30/0214 705/26.7 |

OTHER PUBLICATIONS

Expensify Blog Oct. 2009, retrieved online from <http://blog.expensify.com/2009/10/>> pp. 8.
International Search Report and the Written Opinion for International Application No. PCT/US2010/029811 mailed Jun. 1, 2010.
International Preliminary Report on Patentability for International Application No. PCT/US2010/029811 mailed Oct. 20, 2011.

* cited by examiner

IDENTIFY PURCHASE TRANSACTION DATA ASSOCIATED WITH ELECTRONIC COMMUNICATIONS IDENTIFIED BETWEEN A MERCHANT AND A CUSTOMER REGARDING A TRANSACTION, WHEREIN THE PURCHASE TRANSACTION DATA INCLUDES PRODUCT LEVEL DATA FROM A TRANSACTION
102

RECEIVE THE PURCHASE TRANSACTION DATA, WHEREIN THE PURCHASED TRANSACTION DATA IS RECEIVED IN AN UNSTRUCTURED FORMAT
104

CONVERT THE PURCHASE TRANSACTION DATA FROM THE UNSTRUCTURED FORMAT TO A STRUCTURED FORMAT
106

ASSOCIATE THE STRUCTURED PURCHASE TRANSACTION DATA WITH THE CUSTOMER'S ONLINE BANKING APPLICATION
108

| MERCHANT NAME | | DATE |
|---|---|---|
| THANK YOU FOR SHOPPING WITH US. WE HAVE RECEIVED YOUR ORDER AND ARE PREPARING IT FOR SHIPMENT. PLEASE VISIT YOUR ACCOUNT FOR A HISTORY OF YOUR ORDERS | | |
| ORDER DETAILS | | PRICE |
| 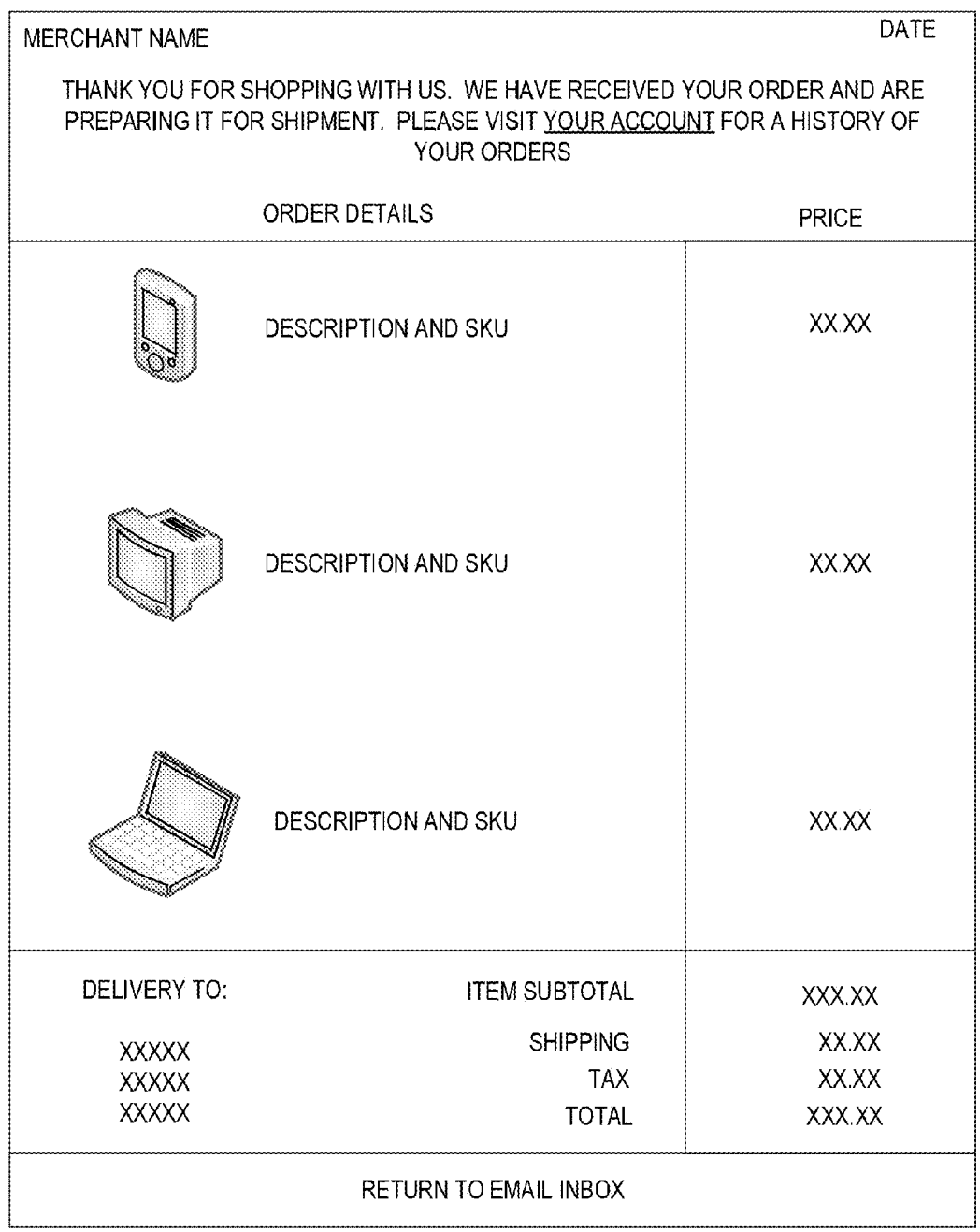 | DESCRIPTION AND SKU | XX.XX |
|  | DESCRIPTION AND SKU | XX.XX |
| 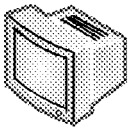 | DESCRIPTION AND SKU | XX.XX |
| DELIVERY TO: XXXXX XXXXX XXXXX | ITEM SUBTOTAL SHIPPING TAX TOTAL | XXX.XX XX.XX XX.XX XXX.XX |
| RETURN TO EMAIL INBOX | | |

FIG. 3

| | ACCOUNTS | TRANSFERS | | CUSTOMER SERVICE |
|---|---|---|---|---|
| ? | DATE | DESCRIPTION | AMOUNT | BALANCE |
| | PROCESSING | CHECK CARD ON XX/XX/XXXX | | |
| | PROCESSING | MERCHANT 1 | | |
| | PROCESSING | ATM WITHDRAWAL | | |
| | XX/XX/XXXX | CHECK NUMBER XXX | | |
| | XX/XX/XXXX | CHECK CARD ON XX/XX/XXXX | | |
| X | XX/XX/XXXX | MERCHANT 2 | | |
| | XX/XX/XXXX | TRANSFER TO ACCOUNT # XXXX | | |
| | XX/XX/XXXX | CHECK CARD ON XX/XX/XXXX | | |
| | XX/XX/XXXX | ATM WITHDRAWAL | | |
| | XX/XX/XXXX | MERCHANT 3 | | |

INFORMATION ON SELECTED TRANSACTION

WE HAVE DETERMINED THAT THE PURCHASE AT MERCHANT 2 ON XX/XX/XXXX CORRESPONDS TO THE ONLINE PURCHASE OF A HANDHELD DEVICE, A MONITOR, AND A LAPTOP IN THIS E-RECEIPT

*FIG. 8*

PRODUCT EVALUATION BASED ON ELECTRONIC RECEIPT DATA

BACKGROUND

In the past few years, there has been an increase in the amount of electronic information provided by merchants to customers regarding purchase of products and services. When a purchase is made online, various electronic communications may be provided to the customer from the merchant relative to a purchase, such as an order confirmation. The communications may be sent to the customer's computer and displayed in a web browser application. The web browser application typically allows the customer to print a hard copy of the order confirmation and to save the confirmation electronically. The merchant will also typically send an email containing the order confirmation to the customer's designated email account. The order confirmation is essentially an e-receipt for the online purchase.

Many merchants are also providing customers the option of receiving e-receipts when the customer is shopping at a brick and mortar merchant location. As such, e-receipts are becoming a popular means of receiving order confirmations when shopping online or at a brick and mortar location.

Another development in the past few years has been the growth of online banking, whereby financial institution customers, (such as bank and credit card customers), may view financial account transaction data, perform online payments and money transfers, view account balances, and the like. Many current online banking applications are fairly robust and provide customers with budgeting tools, financial calculators, and the like to assist the customer to not only perform and view financial transaction date, but also to manages finances.

A need exist for a system that can incorporate electronic receipt information with an online banking application.

BRIEF SUMMARY

Embodiments of the invention are directed to systems, methods, and computer program products for providing product evaluation based at least partially on electronic receipt data. An exemplary apparatus comprises an apparatus for providing product evaluation based on electronic receipt data, the apparatus comprising a memory, a processor, and a module stored in the memory, executable by the processor, and configured to identify purchase transaction data associated with identified electronic communications between a merchant and a customer regarding a transaction, wherein the purchase transaction data includes product level data from a transaction, receive the identified purchase transaction data, wherein the purchase transaction data is received in an unstructured format, convert the purchase transaction data from the unstructured format to a structured format, associate the structured purchase transaction data with the customer's online banking application, aggregate purchase transaction data related to one or more products purchased by the customer, determine one or more products are purchased on a recurring basis based at least partially on an analyses of the purchase transaction data, and provide the customer with one or more options based at least partially on determining the one or more products are purchased on a recurring basis.

In some embodiments, the module is further configured to aggregate purchase transaction data based at least partially on one or more characteristics associated with the one or more products.

In some embodiments, the module is further configured to determine the best price available for at least one product purchased on a recurring basis.

In some embodiments, the one or more options comprise an option to automatically purchase at least one product purchased on a recurring basis.

In some embodiments, the module is further configured to receive one or more user preferences for automatically purchasing a product, and initiate an automatic purchase of the at least one product purchased on a recurring basis based at least partially on the user preferences.

In some embodiments, the module is further configured to determine one or more user preferences for automatically purchasing a product, and initiate an automatic purchase of the at least one product purchased on a recurring basis based at least partially on the user preferences.

In some embodiments, the module is further configured to identify a trend related to the one or more products purchased on a recurring basis, and determine the one or more user preferences for auto-purchasing a product based at least partially on the identified trend.

In some embodiments, the at least one product may be automatically purchased from one or more merchant locations within a predetermined time period based at least partially on the best price available for the at least one product during a specific time period.

In some embodiments, the one or more user preferences for receiving automatically purchasing a product are specified, wherein the one or more user preferences comprise a primary merchant for automatically purchasing a product and a secondary merchant for automatically purchasing a product, and the module is further configured to alert the customer prior to automatically purchasing the at least one product from the secondary merchant; and receive approval to purchase the at least one product from the secondary merchant.

In some embodiments, the one or more options comprise an option to automatically provide offers for at least one product purchased on a recurring basis.

In some embodiments, the module is further configured to automatically enroll the customer in a rewards program associated with the at least one product purchased on a recurring basis.

In some embodiments, the module is further configured to optimize one or more transactions, and wherein optimizing the one or more transactions comprises bifurcating each transaction based at least partially on the best price available for one or more products purchased within the transaction.

An exemplary method may comprise one or more steps for providing product evaluation based on electronic receipt data, the method comprising identifying purchase transaction data associated with identified electronic communications between a merchant and a customer regarding a transaction, wherein the purchase transaction data includes product level data from a transaction, receiving the identified purchase transaction data, wherein the purchase transaction data is received in an unstructured format, converting the purchase transaction data from the unstructured format to a structured format, associating the structured purchase transaction data with the customer's online banking application, aggregating purchase transaction data related to one or more products purchased by the customer, determining one or more products are purchased on a recurring basis based at least partially on an analyses of the purchase transaction data, and providing the customer with one or more options based at least partially on determining the one or more products are purchased on a recurring basis.

In some embodiments, the one or more options comprises an option to automatically purchase at least one product purchased on a recurring basis.

In some embodiments, the method further comprises receiving one or more user preferences for automatically purchasing a product, and initiating an automatic purchase of the at least one product purchased on a recurring basis based at least partially on the user preferences.

In some embodiments, the method further comprises determining one or more user preferences for automatically purchasing a product, and initiating an automatic purchase of the at least one product purchased on a recurring basis based at least partially on the user preferences.

In some embodiments, the method further comprises identifying a trend related to the one or more products purchased on a recurring basis, and determining the one or more user preferences for auto-purchasing a product based at least partially on the identified trend.

In some embodiments, the method further comprises optimizing one or more transactions, and wherein optimizing the one or more transactions comprises bifurcating each transaction based at least partially on the best price available for one or more products purchased within the transaction.

An exemplary computer program product may be provided for providing product evaluation based on electronic receipt data, the computer program product comprising a non-transitory computer-readable medium comprising a set of codes for causing a computer to identify purchase transaction data associated with identified electronic communications between a merchant and a customer regarding a transaction, wherein the purchase transaction data includes product level data from a transaction, receive the identified purchase transaction data, wherein the purchase transaction data is received in an unstructured format, convert the purchase transaction data from the unstructured format to a structured format, associate the structured purchase transaction data with the customer's online banking application, aggregate purchase transaction data related to one or more products purchased by the customer, determine one or more products are purchased on a recurring basis based at least partially on an analyses of the purchase transaction data, and provide the customer with one or more options based at least partially on determining the one or more products are purchased on a recurring basis.

In some embodiments, the one or more options comprises an option to automatically purchase at least one product purchased on a recurring basis.

In some embodiments, the computer program product further comprises a set of codes for causing a computer to receive one or more user preferences for automatically purchasing a product, and initiate an automatic purchase of the at least one product purchased on a recurring basis based at least partially on the user preferences.

In some embodiments, the computer program product further comprises a set of codes for causing a computer to determine one or more user preferences for automatically purchasing a product, and initiate an automatic purchase of the at least one product purchased on a recurring basis based at least partially on the user preferences.

In some embodiments, the computer program product further comprises a set of codes for causing a computer to identify a trend related to the one or more products purchased on a recurring basis, and determine the one or more user preferences for auto-purchasing a product based at least partially on the identified trend.

In some embodiments, the computer program product further comprises a set of codes for causing a computer to optimize one or more transactions, where optimizing the one or more transactions comprises bifurcating each transaction based at least partially on the best price available for one or more products purchased within the transaction.

BRIEF DESCRIPTION OF THE DRAWINGS

Figure 1B:
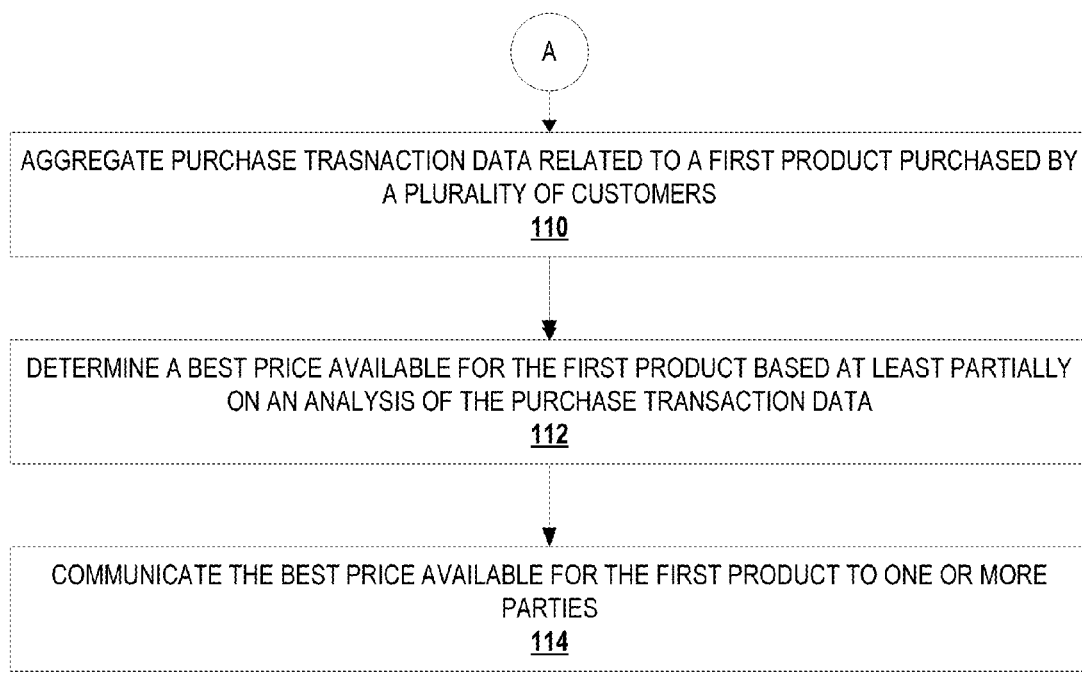
Figure 1C:
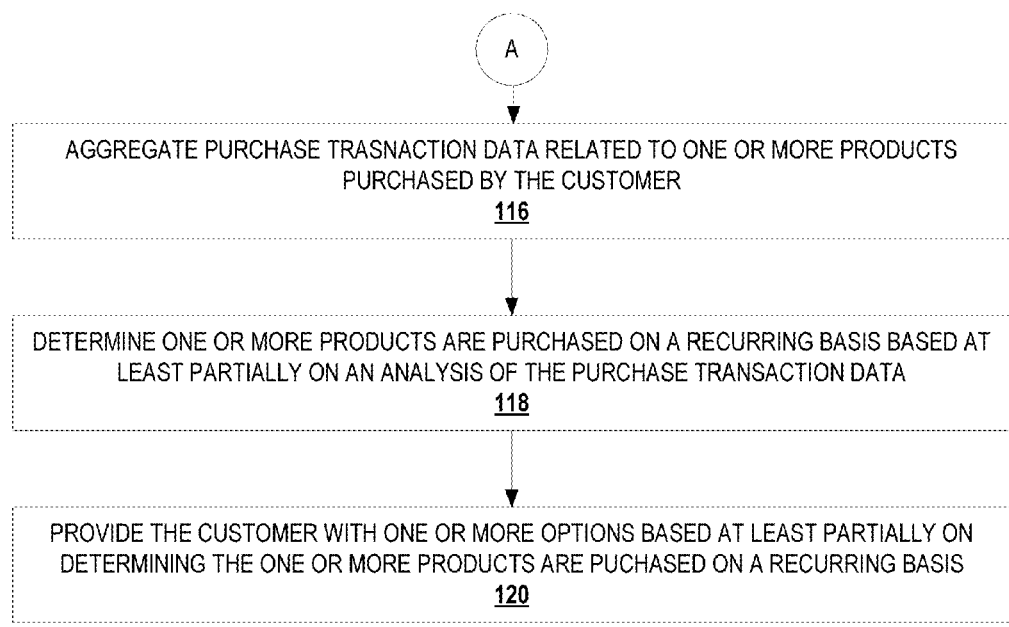
Figure 1D:
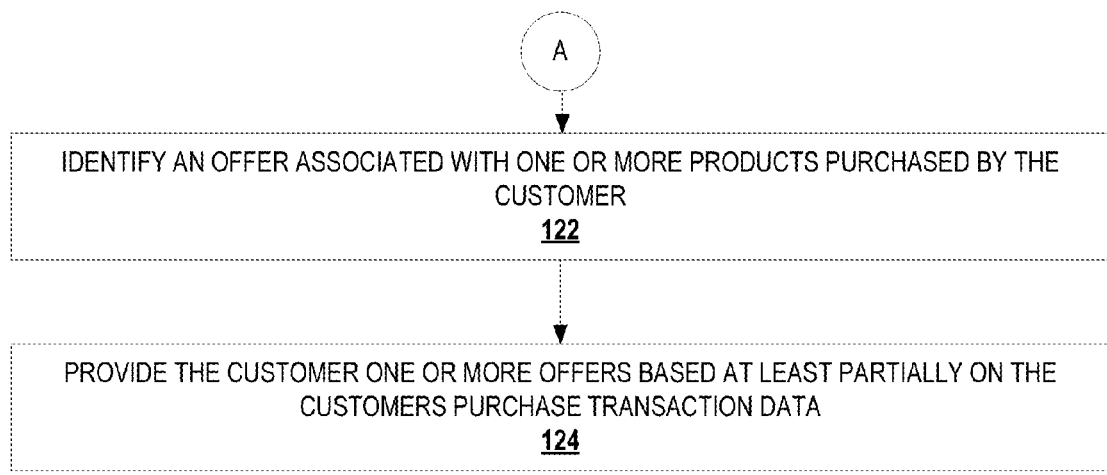
Figure 2:
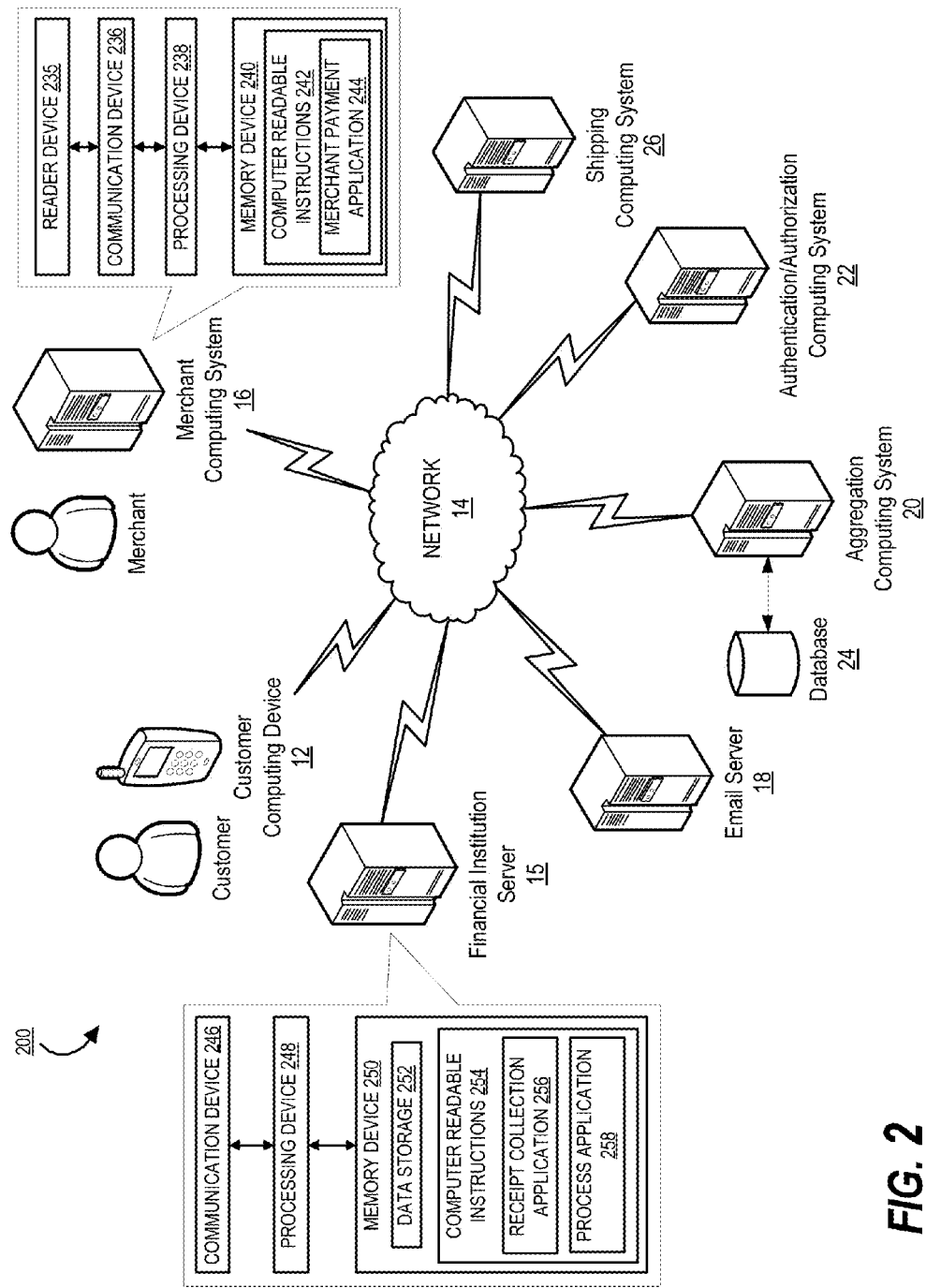
Figure 4:
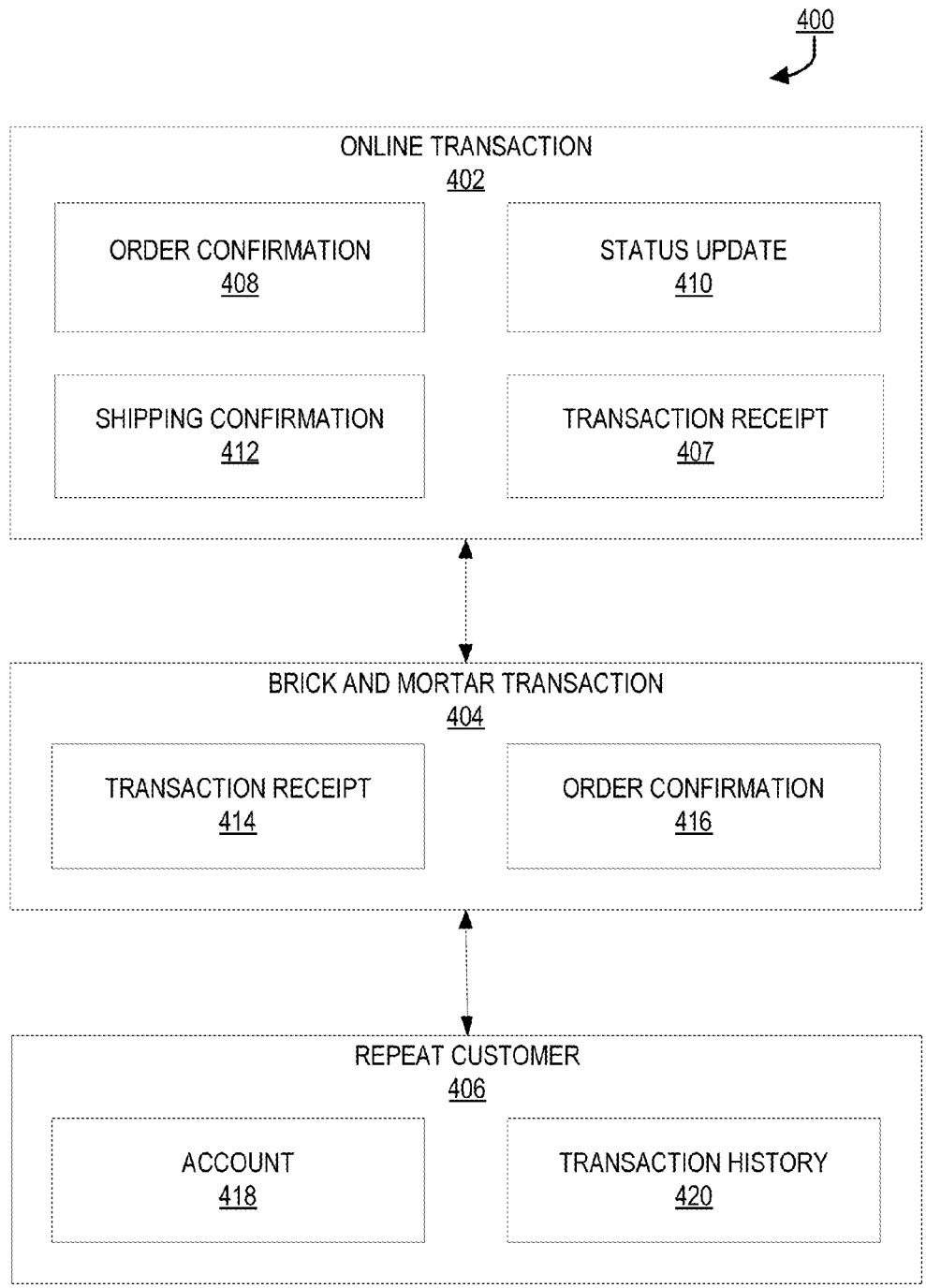
Figure 5:
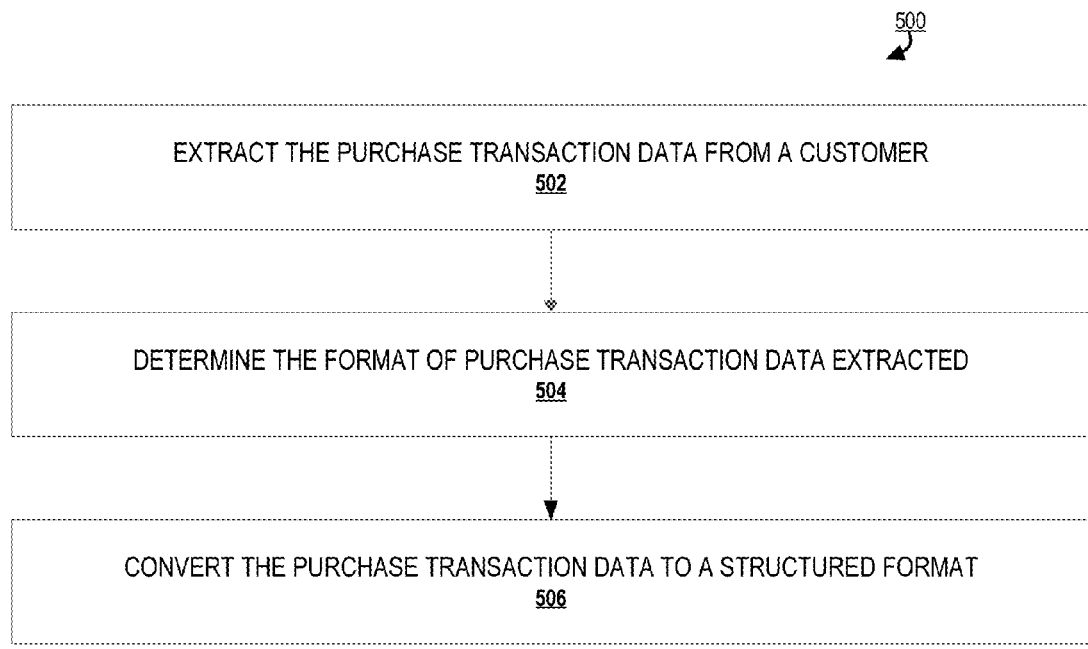
Figure 6:
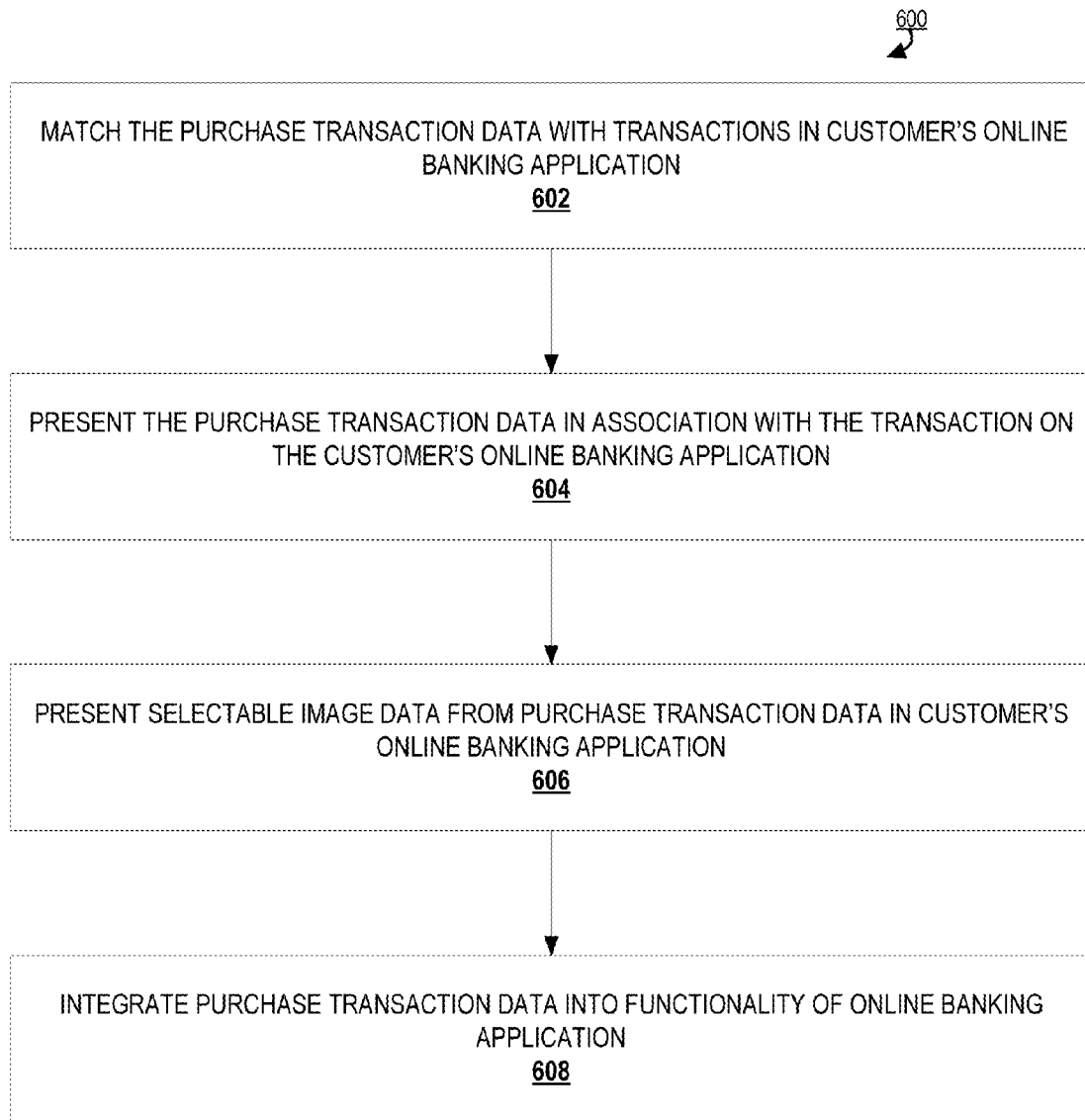
Figure 7:
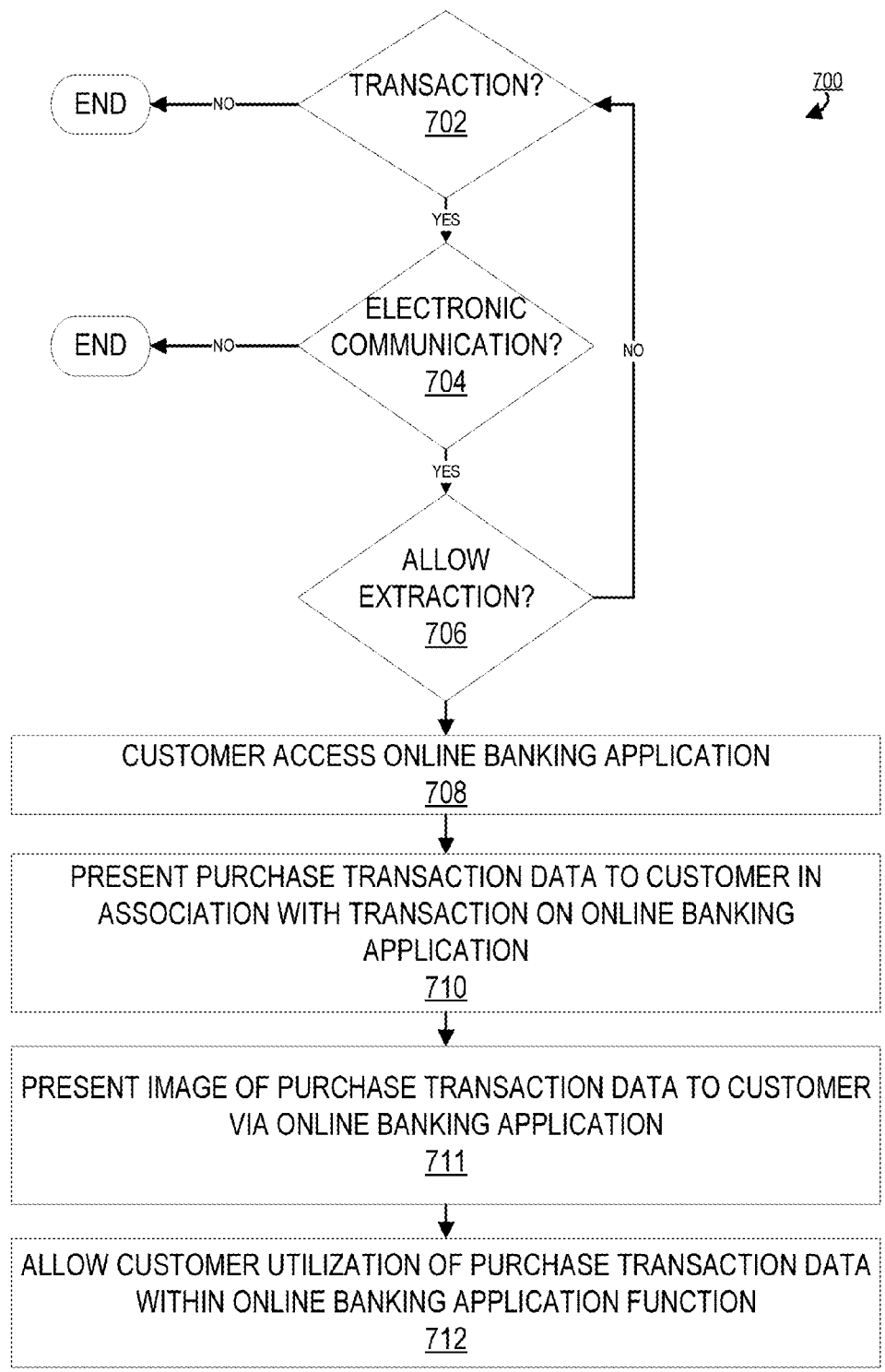

Having thus described embodiments of the invention in general terms, reference will now be made to the accompanying drawings, where:

FIG. 1A is a flowchart illustrating a general process flow illustrating the integration of purchase transaction level data from e-receipts into an online banking application process, in accordance with one embodiment of the present invention, in accordance with embodiments of the present invention;

FIG. 1B is a flowchart illustrating a general process flow for providing price evaluation based on electronic receipt data, in accordance with embodiments of the present invention;

FIG. 1C is a flowchart illustrating a general process flow for providing product evaluation based on electronic receipt data, in accordance with embodiments of the present invention;

FIG. 1D is a flowchart illustrating a general process flow for providing offers based on electronic receipt data, in accordance with embodiments of the present invention;

FIG. 2 is a diagram illustrating a system environment for providing price evaluation based on electronic receipt data, in accordance with embodiments of the present invention;

FIG. 3 an illustration of an interface of an electronic communication between a merchant and a customer providing purchase transaction data to the customer, in accordance with embodiments of the present invention;

FIG. 4 provides a process map illustrating various electronic communications between a customer and merchant;

FIG. 5 is a flowchart illustrating converting the electronic communication to usable purchase transaction level data, in accordance with embodiments of the present invention;

FIG. 6 is a flowchart illustrating the integration of purchase transaction level data from e-receipts into an online banking application, in accordance with embodiments of the present invention;

FIG. 7 is a decision map illustrating the customer's implementation of integration of purchase transaction level data from e-receipts into an online banking application process, in accordance with embodiments of the present invention;

FIG. 8 is an illustration of an interface of an online banking application with the electronic communications associated therewith, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout.

Embodiments of the invention are directed to systems, methods and computer program products that provide for price evaluation based on electronic receipt data. The invention determines for a customer the "best price" available for an item based on electronic receipt data gathered from a plurality of customers.

As used herein, the term "a" and/or "an" shall mean "one or more," even though the phrase "one or more" is also used herein. Where possible, any terms expressed in the singular form herein are meant to also include the plural form and vice versa, unless explicitly stated otherwise.

Furthermore, the term "electronic receipt" or "e-receipt" as used herein may include any electronic communication between a merchant and a customer, where the communication is associated with a transaction. In this way, e-receipts may include information about the transaction, such as location of purchase, the transaction total, order confirmations, shipping confirmations, item description, SKU data, merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like.

The term "purchase transaction data" as used herein may include any data about the transaction identified in a communication between a merchant and a customer. This data may include the same or similar data as to what is on an e-receipt.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to customers.

Some portions of this disclosure are written in terms of a financial institution's unique position with respect to customer transactions. As such, a financial institution may be able to utilize its unique position to create and update online banking applications associated with customers of the financial institution.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

The embodiments described herein may refer to the use of a transaction, transaction event or point of transaction event to trigger the steps, functions, routines, or the like described herein. In various embodiments, occurrence of a transaction triggers the sending of information such as offers and the like. Unless specifically limited by the context, a "transaction", "transaction event" or "point of transaction event" refers to any communication between the customer and the merchant, e.g. financial institution, or other entity monitoring the customer's activities. In some embodiments, for example, a transaction may refer to a purchase of goods or services, a return of goods or services, a payment transaction, a credit transaction, or other interaction involving a customer's bank account.

In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself. As used herein, a "bank account" refers to a credit account, a debit/deposit account, or the like.

Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a customer's computer or mobile device, a customer accessing their e-wallet or any other interaction involving the customer and/or the customer's device that is detectable by the financial institution. As further examples, a transaction may occur when an entity associated with the customer is alerted via the transaction of the customer's location. A transaction may occur when a customer accesses a building, uses a rewards card, and/or performs an account balance query. A transaction may occur as a customer's mobile device establishes a wireless connection, such as a Wi-Fi connection, with a point-of-sale (or point-of-transaction) terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or pre-paid cards; donating to charities; and/or the like.

In some embodiments, the transaction may refer to an event and/or action or group of actions facilitated or performed by a customer's device, such as a customer's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the customer's perspective, the merchant's perspective or both. In some embodiments, the point-of-transaction device refers only to a customer's device, in other embodiments it refers only to a merchant device, and in yet other embodiments, it refers to both a customer device and a merchant device interacting to perform a transaction. For example, in one embodiment, the point-of-transaction device refers to the customer's mobile device configured to communicate with a merchant's point of sale terminal, whereas in other embodiments, the point-of-transaction device refers to the merchant's point of sale terminal configured to communicate with a customer's mobile device, and in yet other embodiments, the point-of-transaction device refers to both the customer's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a customer may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the customer of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

Referring now to FIG. 1A, a general process flow 100 is depicted for providing transaction evaluation based on electronic receipt data. The method may comprise one or more steps including, but not limited to, identifying purchase transaction data associated with electronic communications identified between a merchant and a customer regarding a transaction where the purchase transaction data includes product level data from a transaction 102, receiving the purchase transaction data in an unstructured format 104, converting the purchase transaction data from the unstructured format to a structured format 106, and associating the structured purchase transaction data with the customer's online banking application 108.

In a first embodiment, the general process flow 100 may comprise one or more additional steps, depicted in FIG. 1B, for providing price evaluation based on electronic receipt data. The one or more steps including, but not limited to aggregating purchase transaction data related to a first product purchased by a plurality of customers 110, determining a best price available for the first product based at least partially on an analysis of the purchase transaction data 112, and communicating the best price available for the first product to one or more parties 114.

In a second embodiment, the general process flow 100 may comprise one or more additional steps, depicted in FIG. 1C, for providing product evaluation based on electronic receipt data. The one or more steps including, but not limited to aggregating purchase transaction data related to one or more products purchased by the customer 116, determining one or more products are purchased on a recurring basis based at least partially on an analysis of the purchase transaction data 118, and providing the customer with one or more options based at least partially on determining the one or more products are purchased on a recurring basis 120.

In a third embodiment, the general process flow 100 may comprise one or more additional steps, depicted in FIG. 1C, for providing offers based on electronic receipt data. The one or more steps including but not limited to identifying an offer associated with one or more products purchased by a customer 122, and providing the customer one or more offers based at least partially on the customers purchase transaction data 124.

FIG. 1A provides a high level process flow illustrating the integration of purchase transaction level data from e-receipts into an online banking application process, in accordance with one embodiment of the present invention, which will be discussed in further detail throughout this specification with respect to FIG. 2 through FIG. 8. The first step in the process 100, as illustrated in block 102, is to identify purchase transaction related data associated with the communication between a merchant and a customer. Identifying purchase transaction data may additionally comprise identifying electronic communications between a merchant and a customer where the communications are regarding a transaction. In this way, the system may monitor a customer's email account, social network account, or the like to identify communications from a merchant that are associated with a recent customer transaction.

FIG. 3 illustrates an interface of an electronic communication between a merchant and a customer providing purchase transaction data to the customer 300, in accordance with one embodiment of the present invention. As illustrated in FIG. 3, one embodiment of the electronic communication maybe an email from the merchant to the customer. This may be a communication outlining order details. In the example illustrated in FIG. 3, the customer purchased several items, including a cellular phone, telephone, and computer. Each of these items on the communication comprises a description of the item and the SKU number for that item. In this example, the electronic communication is an e-receipt showing the products purchased, the price of each item, the item subtotal, shipping cost, tax cost, and total cost. As such, this illustrates an example of an e-receipt for an online transaction between a customer and a merchant.

FIG. 4 illustrates a process map for the various electronic communications between a customer and merchant 400, in accordance with one embodiment of the present invention. These potential electronic communications include communications that derived from online transactions 402, brick and mortar transactions 404, or repeat customer 406 transactions.

In some embodiments, online transaction 402 communications may include transaction receipts 407. Other communications for online transactions 402 may include order confirmations 408, status updates 410, shipping updates 412, or the like. The combination of all of these communications may be considered e-receipts, as described above. E-receipts may be any electronic communication from a merchant to a customer based on a transaction. An order confirmation 408 may include detailed information regarding the products or services purchased. For example, in the case of a product, the order confirmation may include stock keeping unit "SKU" code level data, as well as other parameters, such as order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. The order confirmation 408 also includes information about the merchant, such as name, address, phone number, web address, and the like. The shipment confirmation 412 may be an email, text, voice, or other correspondence from a merchant to a customer indicating the shipment of a product from an online transaction. Status updates 410 may include any type of communication from a merchant that may update the shipping, delivery, order, or stocking of a product of a transaction.

In some embodiments, purchase transaction communications may include communications related to transactions at a brick and mortar location 404. In this way, many merchants now also provide e-receipts and other electronic communications to customers shopping at brick and mortar locations. In some embodiments, these communications may include transaction receipts 414, such as an e-receipt. In other embodiments, these communications may include order confirmations 416. In general, at the point of sale, the customer may have previously configured or may be asked at the time of sale as to whether she wishes to receive an e-receipt. By selecting this option, the merchant will send an electronic communication in the form of an e-receipt to the customer's designated email address.

Here again, the e-receipt will typically include a list of services and/or products purchased with SKU level data, and other parameters, as well as information about the merchant, such as name, address, phone number, store number, web address, and the like.

In some embodiments, purchase transaction communications may include communications from a repeat customer account 406. Various merchants now also provide online customer accounts 418 for repeat customers. These online customer accounts 418 may include purchase history 420 information associated with the customer accessible by the customer via ID and passcode entry. Purchase history provides detailed information about services and products purchased by the customer including information found on order confirmations and shipping confirmations for each purchase. Online customer accounts are not limited to online purchases. Many merchants also provide online customer accounts for customers that purchase services and products at brick and mortar locations and then store these transactions in the customer's online account.

Once the purchase transaction related data is identified, the data may be converted into structured form. As such, data coming from several different servers or different merchants in an unstructured form may be processed into a structured form in block 104. FIG. 5 illustrates a process map for converting the electronic communication to usable purchase transaction level data 500, in accordance with one embodiment of the present invention. The process 500 is initiated by identifying one or more electronic communications between a customer and a merchant at step 102. The electronic communications identified are e-receipts or the like associated with a transaction between the customer and the merchant. In some embodiments, in order to identify the electronic communications the system may have access to the customer's email account or other account in which the communication is sent. In this way, the system may continue to monitor the customer's accounts in order to identify electronic communications between a merchant and customer related to a transaction. In response to identifying the one or more electronic communications, the system may identify purchase transaction data associated with the identified communication. This purchase transaction data includes product purchase level data from a transaction between the merchant and customer.

As illustrated in block 502, the system may extract the purchase transaction data identified. This extraction may be from a customer account, such as an email account or the like. In other embodiments, the extraction may be from a text, voice, or the like message communicated to the customer.

Regarding email extraction, the system may initially gains access to the customer's email accounts and retrieves email message headers comprising data fields relative to the email message, such as sender, subject, date/time sent, recipient, and the like. In some embodiments, the system accesses the emails directly. In other embodiments, the system may run search queries of the email database based on known merchant names and/or phrases associated with e-receipt information, such as "receipt," "order confirmation," "shipping confirmation," or the like. Once emails are extracted, further filtering may occur to locate relevant emails. Examples of further filtering may be searches based on known online merchants, third parties known to provide e-receipts, text in the email message subject line that corresponds to known order confirmation subject line text or known shipping confirmation subject line text, such as an email message sent with a subject line containing the text "purchase," "order," "ordered," "shipment," "shipping," "shipped," "invoice," "confirmed," "confirmation," "notification," "receipt," "e-receipt," "ereceipt," "return," "pre-order," "pre-ordered," "tracking," "on its way," "received," "fulfilled," "package," and the like.

Next, as illustrated in block 504, the process 500 continues to determine the format of the purchase transaction data extracted. As such, the unstructured format from the merchant may be identified such that it may be changed to a structured format to integrate into the online banking application. Finally, as illustrated in block 506 the system may convert the purchase transaction data to a structured format for the online banking application to utilize the purchase transaction data extracted.

Financial institutions currently use a data structure conforming to Open Financial Exchange "OFX" specifications for the electronic exchange of financial data between financial institutions, businesses and customers via the Internet. E-receipts, such as electronic order confirmations, shipment confirmation, receipts, and the like typically do not comply to a uniform structure and are generally considered to include data in an "unstructured" format. For example, while one merchant may provide data in an electronic communication to a customer in one format, another merchant may use a completely different format. One merchant may include merchant data at the top of a receipt and another merchant may include such data at the bottom of a receipt. One merchant may list the purchase price for an item on the same line as the description of the item and list the SKU number on the next line, while another merchant may list the data in a completely opposite order. As such, prior to integration of electronic communications relating to customer purchases into online banking, the data from such electronic communications must be parsed into a structured form.

Next, as illustrated in block 106, the process 100 continues by receiving the structured purchase transaction data which includes SKU level data and other product specific data, such as individual price of products, particular products, or the like.

Finally, as illustrated in block 108, the process continues by associating the purchase transaction related data into the customer's online banking application. In this way, the system may integrate the purchase transaction level data, such as the price of each product, the product type, product brand, SKU data, and the like into the customer's online banking application. Furthermore, transactions made with other payment means such as cash or credit cards associated with entities other than the financial institution providing the online banking application may also be identified. In this way, the customer's online banking may have more product specific data about a transaction. For example, a typical online banking application may identify a transaction for $XX.XX dollars at Merchant A. However, associating the purchase transaction data for that transaction may now allow an online banking application to present to the customer more data about the transaction. For example, the online banking application may now state Product 1 $X.XX, Product 2 $X.XX. Product 3 $XX.XX for a total of $XX.XX. Thus providing more detail for the products purchased during the transaction. Furthermore, the e-receipt associated with the transaction may also be presented via the customer's online banking application.

In some embodiments, associating the purchase transaction related data into the customer's online banking application may additionally comprise integrating purchase transaction data from e-receipts into an online banking application. FIG. 6 illustrates a process map for the integration of purchase transaction level data from e-receipts into an online banking application 600, in accordance with one embodiment of the present invention. The process 600 is initiated by receiving the structured purchase transaction data which includes SKU level data and other product specific data, such as individual price of products, particular products, or the like at step 104.

Next, as illustrated in block 602, the system may match the purchase transaction data with transactions in the customer's online banking application. In this way, a financial institution may have some information about a transaction which occurred utilizing one or more of the financial institution products. As such, if the customer utilized a financial institution product, the customer may visualize the purchase on his/her online banking application. Furthermore, the financial institution may identify purchase transaction data received from merchant/customer communications that match the same date, total purchase price, or merchant transaction data at the financial institution. The transaction data at the financial institution may be the total purchase price of the transaction, or other data that may be presented to a customer via an online banking application.

Once matched, the system may present the purchase transaction data in association with the transaction on the customer's online banking application, as illustrated in block 604. In this way, the system may allow a customer to see the purchase transaction level data via his/her online banking application. As such, the customer may be able to view item level spending at his/her online banking application. Thus, the customer may be able to reconcile his/her transactions and/or budget with accuracy. In this way, the system, as illustrated in block 606, may present selectable image data from the purchase transaction data in the customer's online banking application. In this way, the customer may be able to select and visualize e-receipts from his/her online banking application. As such, the customer may be able to select a transaction on his/her online banking application (where the transaction indicates the merchant and the total purchase price) and allow the customer to visualize image data from the purchase transaction. This image data may be an e-receipt or the like that illustrates the products of the transaction, SKU data, purchase price of each product of the transaction, order information, or the like.

Finally, as illustrated in block 608, the system allows for integration of the purchase transaction data into the functionality of the online banking application. In this way, the customer may be able to visualize the purchase transaction data for all transactions into his/her budgeting, expenses, or the like. As such, even cash transactions may be identified based on purchase transaction data and implemented into the functionality of the online banking application. As such, all transactions that have e-receipts or electronic communications associated with the transaction, irrespective of the payment product used by the customer, may be visualized via the customer's online banking application. In this way, not only are transaction totals for transactions utilizing the financial institution products incorporated into the online banking application, all other customer transactions (irrespective of payment product utilized) may be incorporated into the online banking application and integrated into the functionality of the online banking application.

FIG. 7 illustrates a decision map for the customer's implementation of integration of purchase transaction level data from e-receipts into an online banking application process 700, in accordance with one embodiment of the present invention. As illustrated in decision block 702, the customer may enter into a transaction with a merchant. The transaction may be online or off line (at brink and mortar location). If the customer does not enter into a transaction with a merchant the process 700 is terminated. If the customer does enter into a transaction, the process 700 continues at decision block 704. At block 704 the customer may select that an electronic communication may be presented to the customer based on the transaction. In some embodiments, the electronic communication may be automatically sent to the customer if the transaction is online. In some embodiments, the electronic communication may be sent to the customer based on the customer's request, such as a purchase at a brick and mortar merchant location. In some embodiments, the electronic communication may be provided based on a customer account, such as a preferred customer account or the like, that the customer has associated with the merchant.

If there is no electronic communication in decision block 704, the process 700 is terminated. If there is an electronic communication in decision block 704, the process 700 continues to decision block 706. In decision block 706 the customer may have authorized the system to extract purchase transaction data from electronic communications. In this way, the customer may have provided the system with the account and/or passwords to access and extract electronic communications between a merchant and the customer that are in association with a customer transaction. If no extraction is allowed, then the process 700 reverts back to decision block 702, determining if a transaction has occurred between the customer and a merchant. If the customer has allowed extraction in decision block 706, the process 700 continues to block 708 where the customer may access his/her online banking application. The customer may access his/her online banking application by providing a username and a password or something similar thereto in order to access the application.

Once the customer accesses his/her online banking application the system may present purchase transaction data to the customer in association with the transaction on the online banking application, as illustrated in block 710.

FIG. 8 provides an illustration of an interface of an online banking application with the electronic communications associated therewith 800, in accordance with one embodiment of the present invention. As illustrated in FIG. 8, the customer's online banking application shows several different transactions, including processing transactions from ATM withdrawals, check card transactions, and transactions from Merchant 1. The online banking application identifies a transaction from Merchant 2 as being one that the system has (and has matched) purchase transaction data to the transaction. In this way, the information about the transaction from Merchant 2 is presented such as that is an online purchase of a handheld device (cellular phone), monitor, and laptop. Furthermore, there is a link for the online banking application to access the e-receipt (illustrated in FIG. 3).

The link illustrated in FIG. 8 provides a link to the image of the purchase transaction data (such as the e-receipt illustrated in FIG. 3). Referring back to FIG. 7, the process 700 continues in block 711 by presenting the customer with an image of the purchase transaction data to the customer via the online banking application. This is further illustrated in FIG. 9. Finally, as illustrated in block 712, the system allows the customer to utilize the purchase transaction data within the online banking application functionality.

In other embodiments, associating the purchase transaction related data into the customer's online banking application may additionally comprise augmenting the features of the online banking application with the structured purchase transaction data. As such, features such as budgeting applications, or the like may be augmented with the purchase transaction level data to provide a more accurate categorization of expenses or the like.

In some embodiments, integrating the purchase transaction data may further comprise creating a personal finance management system. The process starts by receiving structured purchase transaction data including SKU level data and other product transaction level data from a customer/merchant communication. Next, the process continues to match the purchase transaction data with transactions in the customer's online banking application. In this way, the purchase transaction data from the e-receipt data as well as the information received by the online banking application. The system presents the purchase transaction data in association with the transaction on the customer's online banking application. In this way, SKU level and other product transaction level data may be provided in association with the customer's online banking application. Then, the system may build a finance management interface based on the online banking data and the purchase transaction data.

The finance management interface incorporates the online banking data and the purchase transaction data together to provide one or more of a budget application, management application, or the like. In this way, the system may build a finance management interface utilizing data from all customer transactions, even those transactions completed using cash or other financial institution derived payment devices. The financial management interface may be any type of interface that groups the financial institution online banking data with the purchase transaction data from e-receipts.

The process continues by presenting granular categorization of item level spending via the finance management interface. As such, all transactions performed by a customer whether cash, financial institution payment product, or other payment product may be identified and presented in a granular categorization based on the e-receipts extracted.

FIG. 1B provides a high level process flow illustrating providing price evaluation for a product purchased by a plurality of customers, in accordance with one embodiment of the present invention. The first additional step in the process 100, as illustrated in block 110, is to aggregate purchase transaction data related to a first product that has been purchased by a plurality of consumers. The product information may be aggregated based on one or more product-level characteristics associated with the product as indicate in the purchase transaction data. The product-level characteristics may refer to the price of a product or another product identifier associated with a product such as visual indicia (e.g. barcode), a numerical identifier (e.g. sku number), product name, product brand, and the like. The product data may additionally be associated with characteristics that are specific to the corresponding transaction. Transaction characteristics may refer to the merchant name, merchant location, date and/or time of purchase, and the like.

Any given characteristic may be factored in to a query for use with aggregating the data. In this way, the system may gather analytics based on one or more factors associated with the specific product. The system may gather information related to a specific product type, model and brand. Alternatively, the system may gather information related to various different brands of a specific product type. For example, the system may gather information only related to a DVD Player (model no. "123") manufactured by Company A, or the system may gather information related to several DVD players manufactured by Companies A, B, and C, where the various DVD Players have either similar or identical specifications. In some embodiments, the system may be further configured to receive specification associated with one or more products and determine based on the specifications that the products are equivalent to some extent.

After the product specific information has been aggregated, at block 112, the data is analyzed in order to determine the best price available for the product. In some embodiments, the "best price available" may refer to the lowest cost available for a product. In other embodiments, the "best price available" may refer to the best opportunity cost such as a best price based upon one or more factors including, location, taxes, sales, and the like.

In some embodiments, analyzing the product data may further comprise categorizing and/or sorting the product data in order to determine the best price available. For example, in one embodiment, the product data is sorted according to price information from lowest to highest, the first listed price may then be determined the best price available.

In some embodiments, determining the best price available may be a determination that is based on one or more customer characteristics. The customer characteristics may either be indicated in the customer's account data or based on input explicitly received from the customer. For example, a customer may provide information related to their geographic location, the gas mileage of their vehicle and the like. The system would then take into consideration the current gas prices in the customer's area as well as the approximate traveling distance to the merchant location that has the lowest price available. In this embodiments, the method may comprise one or more additional steps including but not limited to determining a first value (e.g. a specific product price), determining a second value (e.g. traveling cost required to purchase a product from a specific merchant), subtracting the second value from the first value to determine a third value that indicates an overall cost for purchasing a product (e.g. the overall cost to purchase the product from the specific merchant location), repeating the prior steps for one or more additional prices for the specific product at another respective merchant location, and determining the based price available based at least partially on a comparison of at least two of the third values. In one embodiment, the lowest third value is considered to be the best price available. In another example, the system may calculate the best price available based on tax rates with respect to the customers current location. For example, if the customer resides in State A and State B has a lower tax rate associated with the specific product, the system may determine that the customer can receive the best price available if they travel to State B to purchase the product. To this extent, the system may receive general information from third party providers that provides location specific data such as the tax rates of a specific region. Likewise, the system may determine the tax rate of a specific region based at least partially on information provided in the electronic receipt data. In other embodiments, the customer may provide user preferences for providing best price available information. The user preferences may specify that a user only prefers to shops at Merchant A, B, and C locations. To this extent, the system may be further configured to exclude any pricing information related to merchants that are not Merchants A, B, and C based at least partially on the preferences provided by the user.

In some embodiments, determining the best price available may further comprise identifying that the price is associated with one or more offers. The one or more offers may include a sale, coupon, referral discount, rewards points/loyalty discount, and/or the like. In such an embodiment, the system may be further configured to offer the customer the identified offer in addition to providing them the best price available for the product in response to determining that the price is low due to at least one offer. In some embodiments, the system may determine that the best price available is associated with a second product. For example, the a product may be received for free or purchased at a 50% discount rate due to a "buy one get one free" or "buy one get one half off" offer. In this embodiment, product specific data may additionally be analyzed for a second product in addition to the first product based at least partially on determining the best price available is associated with the first product being purchased in conjunction with a second product. The system may additionally be configured to determine the best price available for the second product as well as determining the best price available for the first product.

After the best price available for a specific product has been determined, at block 114, the information related to the best price available is communicated to one or more parties. The information may be communicated via email, from within an online banking application or other banking application, via text message, multimedia messaging and the like. Communicating the best price available to a customer may comprise providing the customer general information related to the best price available such as one or more product prices, respective merchant locations, and/or a supplemental offer. In some embodiments, the supplemental offer may be a suggestion for another product that has similar specifications and a lower cost. In other embodiments, the information related to the best rice available for a product may be communicated to one or more third parties such as a merchant or a product manufacturer.

Communicating the best price available may additionally comprise generating a report comprising information related to the best price available. For example, a report that is sent to a merchant may include information regarding the merchant's position in the respective market. The information may include price comparisons associated with other merchants that offer the specific product. In this way, the merchant can determine how they match up with their competition. The report may also comprise information related to product sales and specifically the quantity of product sales at each respective merchant listed on the report. In a preferred embodiment, merchant names, addresses, and the like are kept anonymous on the generated report. In some embodiment, the merchant can only see their personal information disclosed on the report. The report may additionally comprise a visual representation, such as a graph, that displays the information related to the best price available.

The system may be further configured to detect product dumping related to a specific product and alert a third party such as the product manufacturer that product dumping is occurring or that the product is a gray market product. A report such as this may additionally provide product manufactures insight on how their product is selling within a given market. The system may be configured to determine price elasticity based at least partially on the electronic receipt data and generate a report to summarize the product price information. The system may be additionally be configured to determine the price margin for a specific product and provide merchants with suggestion for price increases and/or decreases for a specific product. For example, the system can determine that Merchant A sells 100 units of Product 1 every week at a price $10.00, the system may also determine that Merchant B sells 100 units of Product 1 every week at a price of $5.00, the system may then suggest that Merchant B can increase their prices by at least $5.00 without affecting their product sales.

In some embodiments, the system is configured to analyze the electronic receipt data related to one or more products and provide product coupling information. For example, the system may determine that each time a bicycle is purchased a helmet is also purchased. The system may then determine suggestion for both product manufacturer and merchants related to providing bundle offers and natural product extensions. For example, if Manufacturer A manufacturer bicycles but not bicycle helmets, the system may then suggest that the manufacturer also make bicycles helmet based at least partially on the determination that each time a bicycle is purchased a helmet is also purchased. In this embodiment, the method may comprise one or more additional steps including but not limited to determining that for a plurality of transactions in which a first product type is purchased a second product type is purchased, determining that a manufacturing company manufacturers the first product and does not manufacture the second product, and providing a suggestion to the manufacturing company to manufacture the second product based at least partially on the determination that for a plurality of transactions in which the first product type is purchased the second product was purchased.

FIG. 1C provides a high level process flow illustrating providing product evaluation for a plurality of products purchased by a customer, in accordance with one embodiment of the present invention. The first additional step in the process 100, as illustrated in block 116, is to aggregate purchase transaction data related to one or more products purchased by the customer. The product information may be aggregated based on one or more product-level characteristics associated with the product as indicate in the purchase transaction data. The product-level characteristics may refer to the price of a product or another product identifier associated with a product such as visual indicia (e.g. barcode), a numerical identifier (e.g. sku number), product name, product brand, and the like. The product data may additionally be associated with characteristics that are specific to the corresponding transaction. Transaction characteristics may refer to the merchant name, merchant location, date and/or time of purchase, frequency of purchase, and the like.

After the product specific information has been aggregated, at block 118, the data is analyzed. Analyzing the product data may result in a plurality of different determinations being made. In one embodiment, the system may analyze the product transaction data and determine that a specific product is purchased on a reoccurring basis by the customer. For example, the customer may purchase laundry detergent once every two weeks. For products that are indicated as reoccurring purchases the system may additionally determine the best price available for the product.

At block 120, the system may provide the customer with one or more options based at least partially on determining the one or more products are purchased on a recurring basis. In one embodiment, a customer may be provided with an option to set up an automatic purchase of a product purchased on a reoccurring basis. The customer may be required to provide an account number, a preference for frequency of purchase and/or one or more additional preferences. After receiving information from the customer or inherently determining the customer preferences the system may set up an automatic purchase of an item. For example, the system may determine based at least partially on the customer's transaction history how often a specific product should be purchased. This determination may be made based on trends detected within the customer purchase transaction history related to the specific product purchased on a reoccurring basis. In some embodiments, the user may accept an option to automatically purchase a given product for a predetermined time period, and disengage the automatic purchase feature and/or program at any given time.

In some embodiments, the system may additionally determine for each automatic purchase the best price available for the product at that time a purchase. So although the product is being purchased on a reoccurring basis at least partially in response to the automatic purchase feature, it may be purchased from different merchant locations depending on which merchant is offering the best price at the time of purchase. For example, Product 1 is purchased once every week by Customer A, so Customer A opts-in to set up auto-purchase of Product 1. On the first week Product 1 is purchased for $22 from Merchant A, but on the second and third weeks Product 1 is purchased from Merchant B for $20. In an alternative example, the customer may specify that they only want Product 1 to be purchased from Merchant A, in this instance, each week Product 1 would be purchased from Merchant A based on the user preferences and regardless of Merchant B offering a better price. In some embodiment, the system may be configured to alert the customer and receive approval prior to purchasing a reoccurring product from an alternative Merchant location. For example, if Product 1 has always been purchased from Merchant A using the auto-purchase feature and the customer does not have any specific user preferences, the system may alert the customer to of a merchant that provides Product 1 at a lower cost and prompt the customer to provide approval prior to purchasing Product 1 from an alternative merchant. For example, a user may have a primary merchant specified for automatically purchasing products and the system may alert the user and receive approval prior to automatically purchasing a product from a secondary merchant. If a customer does not approve purchasing the product from the secondary merchant they may specify that the product should be purchased from the primary merchant or an alternative merchant. Automatic purchase may additionally comprise the product being automatically delivered to the customer.

In another embodiment, a customer may be provided with an option to receive offers for a product purchased on a reoccurring basis. To this extent the customer may automatically be provided with coupons, sales ad, and rewards related to items that are purchased on a reoccurring basis. In one embodiment, the customer is automatically enrolled in rewards and/or loyalty programs associated based at least partially on determining the customer purchases an item on a reoccurring basis. In other embodiment, the customer may be notified of the benefits of a particular rewards program and prompted to provide authorization and/or approval to participate in the program prior to being enrolled into the program. In some embodiments, the customer may be required to agree to one or more terms and conditions prior to being enrolled in the program. The system may receive either an acceptance or denial of the term and conditions as well as the consent to enroll and make a determination as to whether or not the user should be enrolled in the rewards program.

In some embodiments, the method further comprises optimizing one or more future transaction. Transactions may be optimized based either one historical purchase transaction data and/or customer input that specifies preferences for optimizing transactions. Transaction optimization comprises bifurcating one or more items of a transaction to determine the best price available for each product within the transaction. For example a transaction includes three difference products, the system could bifurcate the transaction and determine based on information related to the best price available for each product that Product 1 should be purchased from Merchant A, product 2 should be purchased from Merchant B, and product 3 should be purchased from Merchant C. Transaction optimization can be associated with either individual products that are purchased on a reoccurring basis or entire transactions that are purchased on a recurring basis (e.g. a shopping list that a customer purchases on a monthly basis).

FIG. 1D provides a high level process flow illustrating providing offers based on electronic receipt data, in accordance with one embodiment of the present invention. The first additional step in the process 100, as illustrated in block 122, is to identify an offer associated with one or more products purchased by the customer. The offers may be provided by the financial institution or an third party entity. At block 124, the customer is provided with the offer based at least partially on their purchase transaction data. For example, a financial institution may identify that the customer frequently travels and purchases airline tickets. The financial institution can then offer the customer a credit card that is maintained by the financial institution and when double the customer's frequent flier miles if they use it to purchase their airline tickets.

The system may also identify offers based on data associated with the customer's social networking accounts and/or another third party website to which the customer is associated with. For example, the customer may have an account with a third party deal website that emails the customer deals on a daily basis. The financial institution can then provide the third party website with information related to the customers preferences for deals based on their purchase transaction data, and the third party website may only send the customers offer in which they are specifically interested in. In some embodiments, the third party website is not explicitly given the customers purchase transaction data, but are instead given information relative to the customers personal interest that have been determined by analyzing the customers purchase transaction data.

In one embodiment, the system identifies offers associated with a particular product name. For example if the customer purchased songs from a media library application by Artist A, the system may search and identify all offers based on the artist name. The customer may then be provided with an offer related to concert tickets for Artist A.

The system may also identify offers based on one more themes and or trends associated with products that the customer has purchased. For example, the system may identify a vacationing theme based on the customer purchasing, sun screen, a bathing suit, and a beach ball. The system may then push the customer offers related to beaches proximate to the customers region. In some embodiments, the theme is based on the customer's recent purchase transaction data. In other embodiments, the theme is based on purchase transaction data from a specific time period, where the time period may be predetermined and specified within the user preferences. In some embodiments, the system may automatically determine user preferences for receiving offers based at least partially on the customers purchase transaction data and financial history. The purchase transaction data may additionally provide information that indicate previous offers that the opted into, and the system may identify the user preferences based on previous offers that the customer has opted to receive.

Customers may additionally specify the types of offers that they want to receive. For example, a customer may only want to receive offers related to a certain type of products and/or services, locations and the like. Furthermore, a customer may only be interested in receiving offers related to coupons and sales. In some embodiment, the customer may specify a category associated with the offers they wish to receive. For example, a customer may only be interested in receiving offers related to entertainment and/or traveling. The system may receive user preferences related to the customer's preferences for the types of offers they want to be provided. The system may then take the user preferences into consideration when identifying one or more offers such that all offers not applicable to the user preferences are not identified by the system. Alternatively, the system may take the user preferences into consideration when providing one or more offers such that all for which the customer is eligible to receive are identifies but only offers that are applicable with the user preferences are communicated to the customer.

In some embodiments, customers are provided offers based on their eligibility for the offer. For example, if an offer is related to a debt instrument such as a credit card or loan product, the system may analyze the customer's financial history and determine whether or not the customer is eligible for the offer prior to providing the customer with the offer. If a customer is determined to be ineligible, the system may identify one or more alternative offers to provide the customer with, where the customer is eligible for the alternative offers. The system may determine the customer eligibility for the alternative offer prior to providing or identifying the offer.

Referring now to FIG. 2, FIG. 2 provides a purchase transaction level data integration system environment 200, in accordance with one embodiment of the present invention. The system environment 200 provides for retrieval of electronic communications relating to customer purchase transactions, parsing of data within such electronic communications into structured data, and inclusion of such data into online banking. As illustrated in FIG. 2, the financial institution server 15 is operatively coupled, via a network 14 to the customer computing device 12, merchant computing system 16, shipping computing system 26, authentication/authorization computing system 22, aggregation computing system 20, and the email server 18. In this way, the financial institution server 15 can send information to and receive information from the customer computing device 12, merchant computing system 16, shipping computing system 26, authentication/authorization computing system 22, aggregation computing system 20, and the email server 18. FIG. 2 illustrates only one example of an embodiment of a purchase transaction level data integration system environment 200, and it will be appreciated that in other embodiments one or more of the systems, devices, or servers may be combined into a single system, device, or server, or be made up of multiple systems, devices, or servers.

The network 14 may be a global area network (GAN), such as the Internet, a wide area network (WAN), a local area network (LAN), or any other type of network or combination of networks. The network 14 may provide for wireline, wireless, or a combination wireline and wireless communication between devices on the network 14.

In some embodiments, the customer is an individual making a transaction with a merchant. The transaction may be made at a merchant computing system 16, online or offline, over the phone, at the merchant's place of business and/or other transaction means. The purchase may be made by the customer using a customer computing device 12 such as a mobile wallet (i.e. smart phone, PDA, and the like) or other types of payment systems that communicate with the merchant computing system 16 and/or financial institution server 15 to allow the customer to enter into a transaction and/or receive communications associated with the transaction In some embodiments, the customer may be a merchant or a person, employee, agent, independent contractor, and the like acting on behalf of the merchant to enter into a transaction.

As illustrated a customer maintains one or more computing devices 12, such as a PC, laptop, mobile phone, tablet, television, or the like that is network enabled for communicating across a network 14.

Also, in the system environment 200 is one or more merchant computing systems 16 that is network enabled. In the context of an online shopping experience, the merchant computing system 16 may be one or more financial transaction servers that, either individually or working in concert, are capable of providing web pages to a customer via the network 14, receiving purchase orders for items selected by the customer, communicating with the customer and third party financial institutions to secure payment for the order, and transmitting order confirmation, and possibly shipping confirmation information, to the customer via the network 14 regarding the purchase transaction. In the context of an in-store (or brick and mortar) purchase, the merchant computing system 16 may include a point of sale terminal for scanning or receiving information about products or services being purchased by the customer and communicating with the customer and third party financial institutions to secure payment for the order. Either the point of sale device or a connected merchant server may be used to communicate order confirmation or purchase confirmation information to the customer related to the purchase transaction. If the customer has an online account with the merchant, the merchant computing system may also log the transaction information into the customer's online account.

As such, the merchant computing system 16 generally comprises a reading device 235, a communication device 236, a processing device 238, and a memory device 240. The reading device 235 is operatively coupled to the processing device 238, communication device 236, and the memory device 240. The merchant computing system 16 may include a reader device 235 to receive payment vehicle information from the customer such as online and/or offline purchases. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the customer's payment vehicle and/or transaction data at the merchant computing system 16 and communicates the information via the communication device 236.

As further illustrated in FIG. 2, the merchant computing system 16 comprises computer-readable instructions 242 stored in the memory device 240, which in one embodiment includes the computer-readable instructions 242 of a merchant payment application 244.

In general, the merchant computing system 16 will provide the customer with information relating to the purchase transaction. In the context of an online purchase, the communications may take the form of purchase order confirmations provided as a web page or as an email or as both. In some, embodiments, the merchant computing system 16 may provide a web page purchase order confirmation, and advise the customer to either print, electronically save, or book mark the confirmation web page. The purchase order confirmation is essentially an e-receipt for the online purchase transaction. The order confirmation includes detailed information regarding the products or services purchased, such as for example, in the case of a product, SKU code level data, as well as other parameters associated with the product, such as type/category, size, color, and the like, as well purchase price information, information associated with the merchant, and the like. The merchant computing system 16 may also send other subsequent communications, such as communications confirming shipment of the order, which typically includes the same information as the purchase order confirmation, and in addition, shipping date, tracking number, and other relevant information regarding the order. In the context of an in-store purchase, the merchant computing system 16 may send an e-receipt comprising information similar to that of the purchase order confirmation. In some instances, the customer may actually receive a paper receipt, which the customer may choose to scan into an electronic form and save in a storage device associated with the customer computing device 12.

As such, in the embodiment illustrated in FIG. 2, the merchant payment application 244 allows the merchant computing system 16 to be linked to the financial institution server 208 and the merchant computing system 16 to communicate, via a network 201, the information related to the transaction being made such as communicating an e-receipt associated with the transaction. Furthermore, the merchant payment application 244 may be able to receive communications from the financial institution server 208 such as requests for receipts or the like.

For a plurality of different purchase transactions, a customer may include purchase transaction related data (e.g., order confirmations, shipping confirmations, e-receipts, scanned receipts, typed or handwritten notes, invoices, bills of sale, and the like) in various locations and in various forms. The purchase related data could be stored in a storage device associated with the customer computing device 12, or in an email server 18, or in a customer's account at the merchant's computing system 16. Furthermore, as mentioned, the purchase transaction related information is in an unstructured format. Each merchant may use a customized reporting format for the communications, whereby various data relating to the purchase transaction may be placed in different sequences, different locations, different formats, or the like for a given merchant. Indeed, a given merchant may even use different data formatting and structuring for different communications with the customer (e.g., order confirmation, shipping, confirmation, e-receipt, online customer account information, and the like).

To aggregate and structure data related to purchase transactions, the system environment 200 further comprises an aggregation computing system 20. The aggregation computing system is operatively connected to at least one of the customer computing device 12, the merchant computing system 16, the financial institution server 15, and the email server 18 via the network 14. The aggregation computing system 20 is configured to initially search and locate electronic communications associated with purchase transactions made by the customer, in for example, the customer's email, computer storage device, online accounts, and the like. For this purpose, the system may optionally include an authentication/authorization computing system 22 that comprises security IDs and passwords and other security information associated with the customer for accessing customer's email, storage devices, and customer online accounts.

Regarding email extraction, aggregation computing system 20 initially gains access to the customer's email accounts and retrieves email message headers comprising data fields relative to the email message, such as sender, subject, date/time sent, recipient, and the like. In some embodiments, the aggregation computing system 20 accesses the emails directly. In other embodiments, the aggregation computing system 20 may run search queries of the email database based on known merchant names and/or phrases associated with e-receipt information, such as "receipt," "order confirmation," "shipping confirmation," or the like. Once emails are extracted, further filtering may occur to locate relevant emails. Examples of further filtering may be searches based on known online merchants, third parties known to provide e-receipts, text in the email message subject line that corresponds to known order confirmation subject line text or known shipping confirmation subject line text, such as an email message sent with a subject line containing the text "purchase," "order," "ordered," "shipment," "shipping," "shipped," "invoice," "confirmed," "confirmation," "notification," "receipt," "e-receipt," "ereceipt," "return," "pre-order," "pre-ordered," "tracking," "on its way," "received," "fulfilled," "package," and the like.

Based on the email header analysis, the message bodies for emails of interest may then be accessed. The retrieved email message bodies for the identified email messages of interest are parsed to extract the purchase transaction information and/or shipping information contained therein. Such parsing operation can occur in a variety of known ways. However, because the text contained in email message bodies is un structured (as opposed to the structured tagged elements in a hypertext markup language (HTML) web page which delineate and make recognizable the various fields or elements of the web page), in one embodiment predefined templates are used that have been specifically created to identify the various individual elements or entities of interest in a given email from an online merchant. Use of these predefined templates to parse a retrieved email message body occurs within aggregation computing system 20. Because it is known from header information which merchant sent the email message of interest and whether the email message is a purchase order confirmation or a shipping confirmation from either the header or the message body information, a template specific to the merchant and type of confirmation may be used. Still further, because email message bodies can, as is known in the art, be in either a text or HTML format, a template specific to the type of email message body format may be used in some embodiments.

As an example, for each merchant there are typically four different parsing templates which can be used for electronic communications relating to purchase transactions: (i) a text order confirmation template; (ii) an HTML order confirmation template; (iii) a text shipping confirmation template; and (iv) an HTML shipping confirmation template. Where the email is an e-receipt from a brick and mortar purchase, another template may be used that is specific to the merchant. For some online merchants there are greater or fewer templates depending upon what are the various forms of email messages a given online merchant typically sends. Regardless of the number of templates for a given merchant, each template is specific as to the known particular entities typically included and the order they typically occur within each type of email confirmation message sent by that merchant.

The above describes parsing of email purchase order confirmation, shipping confirmation, or e-receipt data. As mentioned, a customer may scan and save paper receipts, typed or printed notes, invoices, bills of sale, and the like in a storage device or print and save purchase order and shipping confirmation communications sent to the customer by the merchant via a web page. In this instance, the aggregation computing system 20 may first perform optical character recognition "OCR" on the scanned or printed receipts prior to performing the processing performed above. Further, a customer may maintain an online account with a merchant containing purchase data information. In this instance, the aggregation computing system 20 will access the data online via communication with merchant computing system to retrieve this data. The aggregation computing system 20 may use column and/or row headers associated with the online data to parse the data, or it may use procedures similar to the above and discussed below to parse the data into appropriate fields.

Returning to data processing procedures within the system environment 200, in some embodiments, context-free grammars "CFGs" are used to parse fields from purchase transaction data. In some embodiments, instead of using grammars for parsing natural language (e.g., English) structures, the system may use defined smaller grammars describing a particular message format, for example: "(Greetings from merchant)(Details about order)(Details about item 1)(Details about item 2) . . . (Details about item N)(Tax and totals calculation)," and the like. Further, the CFGs may be individually defined, such as in a Backus-Naur Form (BNF) format, or templates may be used for data extraction. In instances, where templates are used, these created templates are grammar and can be converted by known tools, such as Another Tool for Language Recognition "ANTLR", into mail-specific grammars or e-receipt-specific grammars or online customer account information-specific grammars. ANTLR is then used again to convert these grammars into extraction parsers, which can be used by the aggregation computing system 20 to parse the email message bodies, e-receipt bodies, online data, or the like to extract the entities of interest from them. Examples of such extracted entities include merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like.

Other extraction parsers may be used, such as regular expression extraction, which can be used as a brute force pattern matching approach across the purchase information record. With this technique, each word in a given purchase order record is matched against a set of rules. If the rules are met, the piece of text matching the set of rules is returned. For example, shipping companies frequently use a 21 digit tracking number beginning with "1Z" or "91." The aggregation computing system may scan an entire purchase information record to find a 21 digit number with "1Z" or "91" as the first 2 digits. The matched text can then be extracted and used to determine shipping information.

In another embodiment, an HTML document object model (DOM) approach may be used to parse purchase data records. For example, the message body of an email shipping notification may contain HTML code with tags for order, shipping and/or tracking information. The aggregation computing system may use these tags to identify the shipping and/or tracking information for extraction.

Once relevant information is extracted from communications between the customer and merchant regarding purchase transactions, it is stored in purchase data records in a structured database 24.

As is understood, once the purchase transaction data has been extracted, various information regarding a particular purchase transaction is now known, such as merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. This data can be further enriched with additional and/or updated information associated with products or services within the data. For example, the data may be enriched with updated shipping and delivery information from a shipping company computer system 26, product images, information about product returns, warranty information, recall information, and the like. In particular, the aggregation computing system may (1) communicate with the merchant and/or shipping company to update the shipping and delivery information extracted and stored in the database, (2) may search the merchant or the web in general to retrieve product images, and/or (3) communicate with merchant for return policies, warranties, insurance, recalls, and the like.

A portion of the above describes an aggregation computing system according to one embodiment of the present invention. An example of an aggregation computing system is described in U.S. Published Patent Application No. 2013/0024525 titled Augmented Aggregation of Emailed Product Order and Shipping Information, the contents of which are incorporated herein by reference.

As further illustrated in FIG. 2, the financial institution server 15 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 14 and other devices on the network 14, such as, but not limited to the customer computing device 12, merchant computing system 16, shipping computing system 26, authentication/authorization computing system 22, aggregation computing system 20, and the email server 18. As such, the communication device 246 generally comprises a modem, server, or other device for communicating with other devices on the network 15.

As further illustrated in FIG. 2, the financial institution server 15 comprises computer-readable instructions 254 stored in the memory device 250, which in one embodiment includes the computer-readable instructions 254 of a process application 258. In some embodiments, the computer-readable instructions 254 include a receipt collection application 256. In some embodiments, the memory device 250 includes data storage 252 for storing data related to the integration of transaction level data within online banking, including but not limited to data created and/or used by the process application 258 and/or the receipt collection application 256. In this way, the financial institution server 15 may maintain, updated, and the like the customers' online banking application.

In the embodiment illustrated in FIG. 2 the financial institution server 15 comprises a receipt collection application 256. The receipt collection application 256 allows for collection and storage of purchase transaction level data from electronic communications between a customer and merchant. This data may be sent to the financial institution server 15 by one or more other devices on the network 14, such as, but not limited to the customer computing device 12, merchant computing system 16, shipping computing system 26, authentication/authorization computing system 22, aggregation computing system 20, and the email server 18. As such, the receipt collection application 256 may receive receipt information from the other systems on the network through the communication device 246 to store the receipt, post-transaction.

In some embodiments, the receipt collection application 256 may collect receipts associated with any transaction that includes a customer. The e-receipt collection application 256 may periodically receive receipts associated with the transaction. In other embodiments, the receipt collection application 256 may also request receipts associated with customer transactions. The e-receipts may be collected from the email server 18 or the like.

In some embodiments, the system may receive the receipt from the merchant. In this way, the merchant computing system 16 may automatically send e-receipts to the financial institution server 15. As such, once a transaction has been completed between a customer 202 and a merchant associated with merchant computing system 16, the merchant computing system 16 may automatically, via the network 201, provide the receipt collection application 256 with a receipt associated with that particular transaction. In some embodiments, the system may automatically receive the receipt from the customer and/or access customer accounts to get the electronic communication data from the customer. In some embodiments, the receipt collection application 256 may automatically pull electronic communications for the customer via the email server 18. In other embodiments, the email server 18 may automatically provide the receipt collection application 256 with the electronic communications. In some embodiments, the receipt collection application 256 may receive the data from one or more of the other devices on the network 14.

In the embodiment illustrated in FIG. 2 and described throughout much of this specification, the process application 258 may integrate the purchase transaction data received from e-receipts into a customer's online banking environment.

In some embodiments, the process application 258 may integrate the purchase transaction data into the customer's online banking. In other embodiments, the process application 258 may create one or more unique finance management interfaces based on the purchase transaction data in combination with the data pre-existing on the customer's online banking application. Integration into the customer's online banking application allows for the customer to visualize at a granular level the products purchased during a transaction. For example, a typical online banking application may show a transaction using Credit Card 1 for a total of $XXX.XX from Merchant 2. There is more product level information provided to the process application 258. As such, utilizing this data for budgeting applications, reconciliation, or the like may prove to be inaccurate. As such, the process application 258 incorporates the purchase transaction data identified from an electronic communication between a customer and a merchant. Utilizing the purchase transaction data, the process application 258 may present the customer via his/her online banking application information about the transaction such as a transaction using Credit Card 1 for a total of $XXX.XX from Merchant 2 for Product 1 at $XX.XX Product 2 at $X.XX, Product 3 at $XX.XX Product 4 at $XX.XX and Product 5 at $X.XX. In this way, the process application 258 may be able not only to identify each transaction and the total amount of the transaction, but instead provide product level data for each transaction. In this way, budgeting and/or reconciliation may be more accurately accomplished by the customer.

Furthermore, the process application 258 may provide a link to a copy of the e-receipt directly accessible from the online banking application. This way the customer may be able to visualize the exact communication he/she had with the merchant all while in his/her online banking application.

In some embodiments, the process application 258 may create one or more unique finance management interfaces based on the purchase transaction data in combination with the data pre-existing on the customer's online banking application. In this way the combination of purchase transaction data with the data on the customer's online banking application allow a more granular categorization of purchases based on item level spending as well as an insight into cash transaction data that prior interfaces that do not have access to that data.

It is understood that the servers, systems, and devices described herein illustrate one embodiment of the invention. It is further understood that one or more of the servers, systems, and devices can be combined in other embodiments and still function in the same or similar way as the embodiments described herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus configured for integrating unstructured product level data retrieved from electronic communications with an online banking application in a structured format, and thereby providing product evaluation based on electronic receipt data, the apparatus comprising:
   a memory;
   a processor; and
   a module stored in the memory, executable by the processor, and configured to:
      monitor from an email server, one or more electronic accounts associated with a customer, wherein the one or more electronic accounts include at least an email account associated with electronic communications between the customer and a merchant;
      identify, via the email server, purchase transaction data associated with identified electronic communications between the merchant and the customer regarding a purchase transaction, wherein the purchase transaction data includes product level data associated with the purchase transaction between the customer and the merchant, wherein the purchase transaction data is automatically identified from the one or more electronic accounts associated with the customer, wherein identifying the purchase transaction data further comprises:
         determining one or more data fields relevant to the purchase transaction made by the customer with the merchant;
         retrieving, from the email server, electronic header information associated with electronic communications of the customer from the one or more electronic accounts; and
         identifying an email message associated with the purchase transaction made by the customer with the merchant based on at least determining that the electronic header information associated with the email message matches the one or more data fields relevant to the purchase transaction, wherein the email message is identified from the electronic communications of the one or more accounts;
      retrieve, electronically from the email server, the identified purchase transaction data, wherein the identified purchase transaction data is retrieved in an unstructured format from the one or more electronic accounts associated with the customer, wherein retrieving the identified transaction data comprises:
         retrieving the email message containing the identified transaction data from the email server;
         identifying the merchant and a confirmation type of the email message based on analyzing the electronic header information contained in the email message;
         identifying a parsing template based on identifying the merchant and the confirmation type, wherein the parsing template is identified from a group comprising: an HTML (Hypertext Markup Language) order confirmation template, a text order confirmation template, an HTML shipping confirmation template and a text shipping confirmation template; and
         retrieving the purchase transaction data from the email message based on at least the parsing template, wherein the purchase transaction data comprises the product level data associated with the purchase transaction;
      electronically convert the retrieved purchase transaction data from the unstructured format to a structured format based on the parsing template, wherein the structured format is associated with an OFX (Open Financial Exchange) format;
      integrate the structured purchase transaction data converted from the unstructured purchase transaction data with the customer's online banking application, whereby the product level data associated with the purchase transaction can be viewed from within the online banking application in response to integrating the structured purchase transaction data with the customer's online banking application, wherein integrating the structured purchase transaction data with the customer's online banking application further comprises:
         associating a record in the customer's online banking application with the product level data, based on determining that a payment instrument, a payment date and/or a total purchase amount associated with the product level data is the same as that of the record; and
         presenting the record integrated with the structured product level data and selectable image data on a display of the customer's online banking application, wherein the selectable image data is constructed based on the identified email message;
      aggregate purchase transaction data related to one or more products purchased by the customer;
      determine that the one or more products are purchased on a recurring basis based at least partially on an analysis of the purchase transaction data; and
      provide the customer with one or more options based at least partially on determining the one or more products are purchased on a recurring basis.

2. The apparatus of claim 1, wherein the module is further configured to aggregate purchase transaction data based at least partially on one or more characteristics associated with the one or more products.

3. The apparatus of claim 1, wherein the module is further configured to determine the best price available for at least one product purchased on a recurring basis.

4. The apparatus of claim 1, wherein the one or more options comprises an option to automatically purchase at least one product purchased on a recurring basis.

5. The apparatus of claim 4, where the module is further configured to:
   receive one or more user preferences for automatically purchasing a product; and
   initiate an automatic purchase of the at least one product purchased on a recurring basis based at least partially on the user preferences.

6. The apparatus of claim 4, wherein the module is further configured to:
   determine one or more user preferences for automatically purchasing a product; and initiate an automatic purchase of the at least one product purchased on a recurring basis based at least partially on the user preferences.

7. The apparatus of claim 6, wherein the module is further configured to:
  identify a trend related to the one or more products purchased on a recurring basis; and
  determine the one or more user preferences for auto-purchasing a product based at least partially on the identified trend.

8. The apparatus of claim 4, wherein the at least one product may be automatically purchased from one or more merchant locations within a predetermined time period based at least partially on the best price available for the at least one product during a specific time period.

9. The apparatus of claim 4, wherein one or more user preferences for receiving automatically purchasing a product are specified, wherein the one or more user preferences comprise a primary merchant for automatically purchasing a product and a secondary merchant for automatically purchasing a product, and wherein the module is further configured to:
  alert the customer prior to automatically purchasing the at least one product from the secondary merchant; and
  receive approval to purchase the at least one product from the secondary merchant.

10. The apparatus of claim 1, wherein the one or more options comprises an option to automatically provide offers for at least one product purchased on a recurring basis.

11. The apparatus of claim 1, wherein the module is further configured to automatically enroll the customer in a rewards program associated with the at least one product purchased on a recurring basis.

12. The apparatus of claim 1, wherein the module is further configured to optimize one or more transactions, and wherein optimizing the one or more transactions comprises bifurcating each transaction based at least partially on the best price available for one or more products purchased within the transaction.

13. A method configured for integrating unstructured product level data retrieved from electronic communications with an online banking application in a structured format, and thereby providing product evaluation based on electronic receipt data, the method comprising:
  monitor from an email server, one or more electronic accounts associated with a customer, wherein the one or more electronic accounts include at least an email account associated with electronic communications between the customer and a merchant;
  identifying, via the email server, purchase transaction data associated with identified electronic communications between the merchant and the customer regarding a purchase transaction, wherein the purchase transaction data includes product level data associated with the purchase transaction between the customer and the merchant, wherein the purchase transaction data is automatically identified from the one or more electronic accounts associated with the customer, wherein identifying the purchase transaction data further comprises:
    determining one or more data fields relevant to the purchase transaction made by the customer with the merchant;
    retrieving, from the email server, electronic header information associated with electronic communications of the customer from the one or more electronic accounts; and
    identifying an email message associated with the purchase transaction made by the customer with the merchant based on at least determining that the electronic header information associated with the email message matches the one or more data fields relevant to the purchase transaction, wherein the email message is identified from the electronic communications of the one or more accounts;
  retrieving, electronically from the email server, the identified purchase transaction data, wherein the identified purchase transaction data is received retrieved in an unstructured format from the one or more electronic accounts associated with the customer, wherein retrieving the identified transaction data comprises:
    retrieving the email message containing the identified transaction data from the email server;
    identifying the merchant and a confirmation type of the email message based on analyzing the electronic header information contained in the email message;
    identifying a parsing template based on identifying the merchant and the confirmation type, wherein the parsing template is identified from a group comprising: an HTML (Hypertext Markup Language) order confirmation template, a text order confirmation template, an HTML shipping confirmation template and a text shipping confirmation template; and
    retrieving the purchase transaction data from the email message based on at least the parsing template, wherein the purchase transaction data comprises the product level data associated with the purchase transaction;
  electronically converting the retrieved purchase transaction data from the unstructured format to a structured format based on the parsing template, wherein the structured format is associated with an OFX (Open Financial Exchange) format;
  integrating the structured purchase transaction data converted from the unstructured purchase transaction data with the customer's online banking application, whereby the product level data associated with the purchase transaction can be viewed from within the online banking application in response to integrating the structured purchase transaction data with the customer's online banking application, wherein integrating the structured purchase transaction data with the customer's online banking application further comprises:
    associating a record in the customer's online banking application with the product level data, based on determining that a payment instrument, a payment date and/or a total purchase amount associated with the product level data is the same as that of the record; and
    presenting the record integrated with the structured product level data and selectable image data on a display of the customer's online banking application, wherein the selectable image data is constructed based on the identified email message;
  aggregating purchase transaction data related to one or more products purchased by the customer;
  determining that the one or more products are purchased on a recurring basis based at least partially on an analysis of the purchase transaction data; and
  providing the customer with one or more options based at least partially on determining the one or more products are purchased on a recurring basis.

14. The method of claim 13, wherein the one or more options comprises an option to automatically purchase at least one product purchased on a recurring basis.

15. The method of claim 14, where the method further comprises:
receiving one or more user preferences for automatically purchasing a product; and
initiating an automatic purchase of the at least one product purchased on a recurring basis based at least partially on the user preferences.

16. The method of claim 14, wherein the method further comprises:
determining one or more user preferences for automatically purchasing a product; and
initiating an automatic purchase of the at least one product purchased on a recurring basis based at least partially on the user preferences.

17. The method of claim 16, wherein the method further comprises:
identifying a trend related to the one or more products purchased on a recurring basis; and
determining the one or more user preferences for auto-purchasing a product based at least partially on the identified trend.

18. The method of claim 13, wherein the method further comprises optimizing one or more transactions, and wherein optimizing the one or more transactions comprises bifurcating each transaction based at least partially on the best price available for one or more products purchased within the transaction.

19. A computer program product configured for integrating unstructured product level data retrieved from electronic communications with an online banking application in a structured format, and thereby providing product evaluation based on electronic receipt data, the computer program product comprising:
a non-transitory computer-readable medium comprising a set of codes for causing a computer to:
monitor from an email server, one or more electronic accounts associated with a customer, wherein the one or more electronic accounts include at least an email account associated with electronic communications between the customer and a merchant;
identify, via the email server, purchase transaction data associated with identified electronic communications between the merchant and the customer regarding a purchase transaction, wherein the purchase transaction data includes product level data associated with the purchase transaction between the customer and the merchant, wherein the purchase transaction data is automatically identified from the one or more electronic accounts associated with the customer, wherein identifying the purchase transaction data further comprises:
determining one or more data fields relevant to the purchase transaction made by the customer with the merchant;
retrieving, from the email server, electronic header information associated with electronic communications of the customer from the one or more electronic accounts; and
identifying an email message associated with the purchase transaction made by the customer with the merchant based on at least determining that the electronic header information associated with the email message matches the one or more data fields relevant to the purchase transaction, wherein the email message is identified from the electronic communications of the one or more accounts;
retrieve, electronically from the email server, the identified purchase transaction data, wherein the identified purchase transaction data is received retrieved in an unstructured format from the one or more electronic accounts associated with the customer, wherein retrieving the identified transaction data comprises:
retrieving the email message containing the identified transaction data from the email server;
identifying the merchant and a confirmation type of the email message based on analyzing the electronic header information contained in the email message;
identifying a parsing template based on identifying the merchant and the confirmation type, wherein the parsing template is identified from a group comprising: an HTML (Hypertext Markup Language) order confirmation template, a text order confirmation template, an HTML shipping confirmation template and a text shipping confirmation template; and
retrieving the purchase transaction data from the email message based on at least the parsing template, wherein the purchase transaction data comprises the product level data associated with the purchase transaction;
electronically convert the retrieved purchase transaction data from the unstructured format to a structured format based on the parsing template, wherein the structured format is associated with an OFX (Open Financial Exchange) format;
integrate the structured purchase transaction data converted from the unstructured purchase transaction data with the customer's online banking application;
aggregate purchase transaction data related to one or more products purchased by the customer, whereby the product level data associated with the purchase transaction can be viewed from within the online banking application in response to integrating the structured purchase transaction data with the customer's online banking application, wherein integrating the structured purchase transaction data with the customer's online banking application further comprises:
associating a record in the customer's online banking application with the product level data, based on determining that a payment instrument, a payment date and/or a total purchase amount associated with the product level data is the same as that of the record; and
present the record integrated with the structured product level data and selectable image data on a display of the customer's online banking application, wherein the selectable image data is constructed based on the identified email message;
determine that the one or more products are purchased on a recurring basis based at least partially on an analysis of the purchase transaction data; and
provide the customer with one or more options based at least partially on determining the one or more products are purchased on a recurring basis.

20. The computer program product of claim 19, wherein the one or more options comprises an option to automatically purchase at least one product purchased on a recurring basis.

21. The computer program product of claim 20, the computer program product further comprising a set of codes for causing a computer to:

receive one or more user preferences for automatically purchasing a product; and initiate an automatic purchase of the at least one product purchased on a recurring basis based at least partially on the user preferences.

22. The computer program product of claim 20, the computer program product further comprising a set of codes for causing a computer to:

determine one or more user preferences for automatically purchasing a product; and initiate an automatic purchase of the at least one product purchased on a recurring basis based at least partially on the user preferences.

23. The computer program product of claim 22, the computer program product further comprising a set of codes for causing a computer to:

identify a trend related to the one or more products purchased on a recurring basis; and determine the one or more user preferences for auto-purchasing a product based at least partially on the identified trend.

24. The computer program product of claim 19, the computer program product further comprising a set of codes for causing a computer to optimize one or more transactions, and wherein optimizing the one or more transactions comprises bifurcating each transaction based at least partially on the best price available for one or more products purchased within the transaction.

* * * * *